US009637131B2

(12) United States Patent
Oohata

(10) Patent No.: US 9,637,131 B2
(45) Date of Patent: May 2, 2017

(54) CLUTCH CONTROL SYSTEM

(71) Applicant: YAMAHA HATSUDOKI KABUSHIKI KAISHA, Iwata-shi, Shizuoka-ken (JP)

(72) Inventor: Shinobu Oohata, Iwata (JP)

(73) Assignee: YAMAHA HATSUDOKI KABUSHIKI KAISHA, Iwata-shi, Shizuoka-ken (JP)

(*) Notice: Subject to any disclaimer, the term of this patent is extended or adjusted under 35 U.S.C. 154(b) by 0 days.

(21) Appl. No.: 14/970,366

(22) Filed: Dec. 15, 2015

(65) Prior Publication Data

US 2016/0167666 A1 Jun. 16, 2016

(30) Foreign Application Priority Data

Dec. 16, 2014 (JP) .................. 2014-254388

(51) Int. Cl.
| G06F 17/00 | (2006.01) |
| B60W 30/19 | (2012.01) |
| B60W 10/02 | (2006.01) |
| B60W 10/06 | (2006.01) |
| F16D 48/06 | (2006.01) |

(52) U.S. Cl.
CPC ............ *B60W 30/19* (2013.01); *B60W 10/02* (2013.01); *B60W 10/06* (2013.01); *F16D 48/06* (2013.01); *B60W 2510/0208* (2013.01); *B60W 2510/0638* (2013.01); *B60W 2710/021* (2013.01); *B60W 2710/0627* (2013.01); *B60W 2710/0644* (2013.01); *F16D 2500/10412* (2013.01); *F16D 2500/3067* (2013.01); *F16D 2500/504* (2013.01); *F16D 2500/5043* (2013.01); *F16D 2500/7041* (2013.01); *F16D 2500/70668* (2013.01)

(58) Field of Classification Search
None
See application file for complete search history.

(56) References Cited

U.S. PATENT DOCUMENTS

| 7,346,442 B2 * | 3/2008 | Higashimata ......... F16H 61/143 701/67 |
| 8,439,799 B1 | 5/2013 | Muto et al. |
| 2002/0128763 A1 | 9/2002 | Jager et al. |
| 2016/0053833 A1 | 2/2016 | Sakamoto |

FOREIGN PATENT DOCUMENTS

| JP | H0337476 A | 2/1991 |
| JP | H09287509 A | 11/1997 |
| JP | 2002-286060 A | 10/2002 |
| KR | 2002-0095582 A | 12/2002 |
| KR | 2004-0009303 A | 1/2004 |

* cited by examiner

Primary Examiner — Dirk Wright
(74) Attorney, Agent, or Firm — Rabin & Berdo, P.C.

(57) ABSTRACT

A clutch control system includes a hunting determining unit that determines whether or not a hunting condition, under which hunting occurs in an engine rotational speed of an engine, is met, and a clutch position control unit. The clutch position control unit executes a first clutch position control, which is in accordance with engine rotation information, on the clutch if the hunting determining unit determines that the hunting condition is not met, and executes a second clutch position control, which is lower in response to the engine rotation information than the first clutch position control, on the clutch if the hunting determining unit determines that the hunting condition is met.

22 Claims, 16 Drawing Sheets

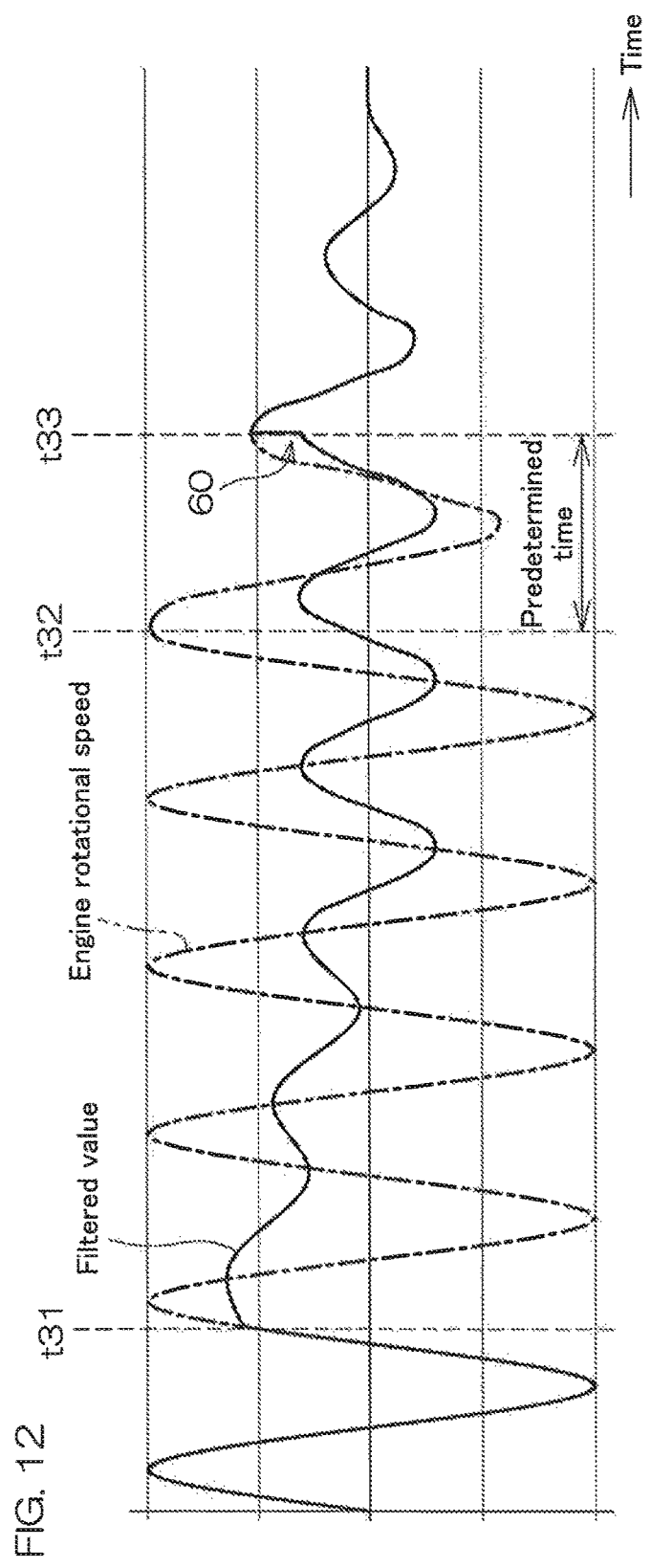

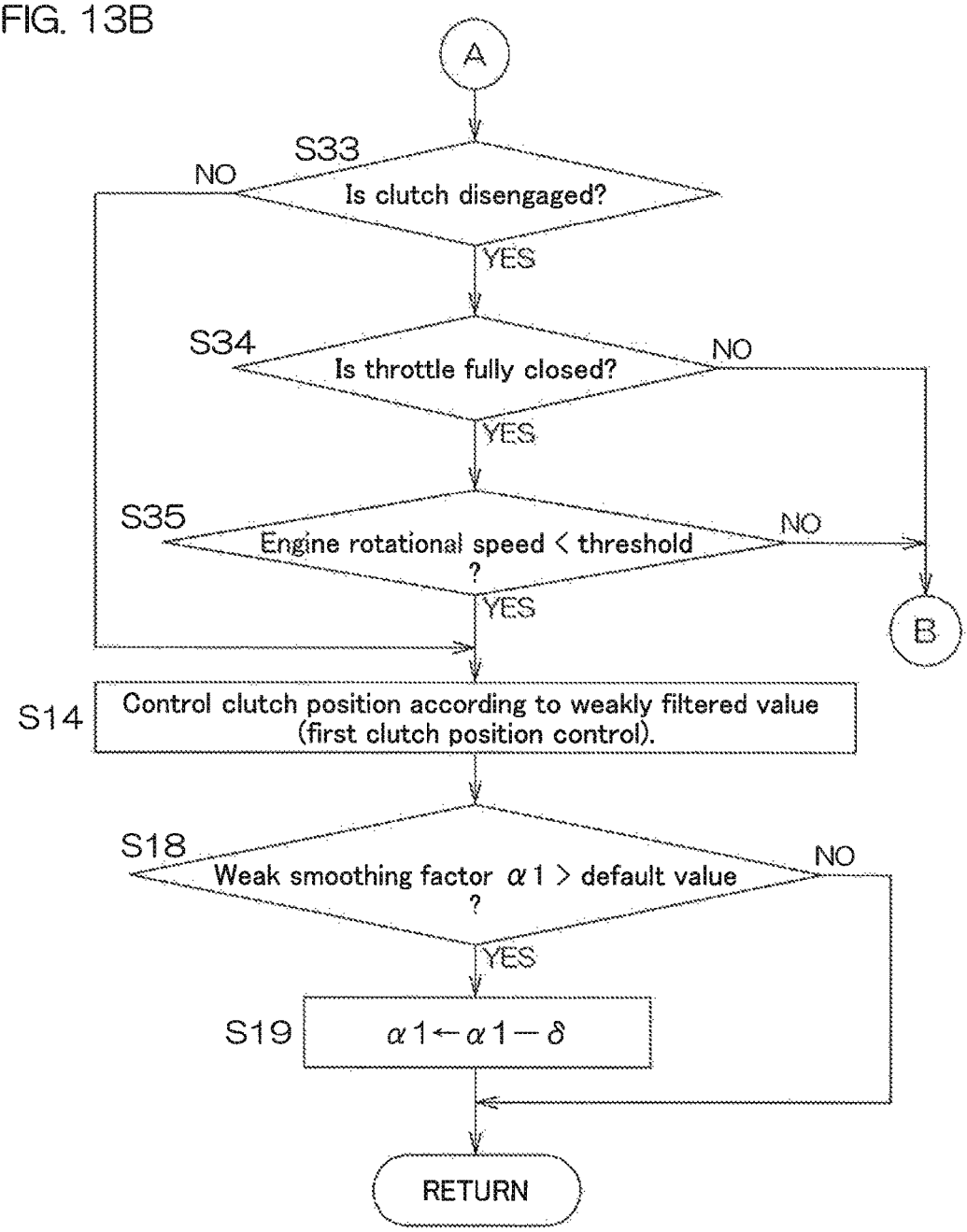

CLUTCH CONTROL SYSTEM

BACKGROUND OF THE INVENTION

1. Field of the Invention

The present invention relates to a clutch control system arranged to engage a clutch automatically.

2. Description of Related Art

There is known a vehicle that includes a semi-automatic transmission, with which, while a driver performs a shifting operation, clutch operation is left up to automatic control by a control unit. The driver does not have to operate a clutch and suffices to perform an accelerator operation, a braking operation, and a shift operation.

A prior art of such a vehicle is disclosed in Japanese Patent Application Publication No. 2002-286060. With the prior art, a clutch engagement operation is controlled in accordance with engine rotational speed and engine rotational acceleration. More specifically, the clutch is controlled so that when the engine rotational speed is low and the engine rotational acceleration is high, the clutch is engaged slowly or a clutch engagement amount is made small. Clutch engagement is thereby controlled optimally in accordance with the stepping-on of an accelerator pedal.

SUMMARY OF THE INVENTION

The inventor of preferred embodiments of the present invention described and claimed in the present application conducted an extensive study and research regarding a clutch control system, such as the one described above, and in doing so, discovered and first recognized new unique challenges and previously unrecognized possibilities for improvements as described in greater detail below.

With the prior art of Japanese Patent Application Publication No. 2002-286060, riding feeling may not be satisfactory when the engine rotational speed is low. Specifically, in a case of travelling on a steeply sloping road, as in off-road travelling, it may be desired, during low-speed travel, that is, while the engine rotational speed is low, to step on the accelerator to rapidly increase the engine rotational speed. In such a case, the clutch is engaged slowly or the clutch engagement amount is made small with the prior art of Japanese Patent Application Publication No. 2002-286060. The riding feeling may thus not be satisfactory.

Also, when a rotational speed suppression control is performed to suppress the engine rotational speed, a satisfactory riding feeling is not necessarily obtained with the prior art of Japanese Patent Application Publication No. 2002-286060. The rotational speed suppression control is aimed at lightening loads on the engine and the clutch, etc., and intervenes with engine control when a certain condition is met and executes, for example, fuel supply cutting. During execution of such rotational speed suppression control, hunting of the engine rotational speed occurs and therefore the engine rotational speed increases and decreases at a short cycle. Accordingly, the engine rotational acceleration undergoes repeated inversion between a positive value and a negative value at a short cycle, that is, so called hunting occurs. The prior art of Japanese Patent Application Publication No. 2002-286060 does not disclose any countermeasure to these circumstances, and moreover, under the circumstances where hunting of the engine rotational acceleration occurs, an appropriate clutch engagement amount may not be attained with the prior art of Japanese Patent Application Publication No. 2002-286060. This is because engagement of the clutch is maintained (withheld) when the engine rotational acceleration is negative.

By controlling the operation of the clutch in accordance with the engine rotational speed and without dependence on the engine rotational acceleration, the clutch can be actuated with sufficient response even when the engine rotational speed is low. However, when engine rotational speed hunting is occurring due to the rotational speed suppression control, the clutch operation also undergoes hunting accordingly and a half-clutch state may be sustained for a long period. Large loads may thus be applied to the engine and the clutch.

Such a problem is not restricted to vehicles and is an issue in common with other machinery with an arrangement where a driving force of an engine is transmitted to an actuated portion via a clutch.

A preferred embodiment of the present invention therefore provides a clutch control system with which unstable clutch behavior due to engine rotational speed hunting is avoided.

In order to overcome the previously unrecognized and unsolved challenges described above, a preferred embodiment of the present invention provides a clutch control system arranged to control a clutch interposed in a power transmission path from an engine to an actuated portion. The clutch control system includes a rotational speed control unit programmed to execute a rotational speed suppression control of suppressing an engine rotational speed of the engine when a predetermined engine rotational speed suppression condition is met, and a clutch position control unit programmed to execute a first clutch position control, which is in accordance with engine rotation information, on the clutch if the rotational speed control unit is not executing the rotational speed suppression control, and to execute a second clutch position control, which is lower in response to the engine rotation information than the first clutch position control, on the clutch if the rotational speed control unit is executing the rotational speed suppression control.

With the present arrangement, when the engine rotational speed suppression condition is met, the rotational speed suppression control for suppressing the engine rotational speed is executed. The clutch position control unit executes the first clutch position control if the rotational speed suppression control is not being executed and executes the second clutch position control if the rotational speed suppression control is being executed. The first clutch position control is a position control of the clutch that is in accordance with the engine rotation information. The second clutch position control is a position control of the clutch that is lower in response to the engine rotation information than the first clutch position control. The response to the engine rotation information is thus decreased during execution of the rotational speed suppression control and therefore even if engine rotational speed hunting occurs, influence on the clutch position control is low. Unstable clutch behavior can thereby be avoided to suppress adverse influence on the engine and the clutch.

The engine rotation information is information expressing a rotational state of the engine and may specifically be the engine rotational speed or an engine rotational acceleration (differential value of the engine rotational speed).

The second clutch position control includes, in addition to a case of controlling the clutch position in response to the engine rotation information, a case of not responding to the engine rotation information. Specifically, a control of maintaining the clutch in a disengaged state without dependence on the engine rotation information is also an example of the second clutch position control.

An example of machinery to which the present preferred embodiment is applied is a vehicle. In this case, a vehicle wheel may be an example of an actuated portion.

In a preferred embodiment of the present invention, the rotational speed suppression control includes a fuel supply cutting control of cutting the supply of fuel to the engine. With the present arrangement, hunting may occur in the engine rotational speed due to the fuel supply cutting control. Despite this, the second clutch position control can prevent the engine rotational speed hunting from having a large influence on the position control of the clutch. Clutch behavior can thereby be stabilized and adverse influence on the engine and the clutch can be suppressed.

In a preferred embodiment of the present invention, the engine includes a fuel injector and the fuel supply cutting control includes an injection cutting control of cutting fuel injection by the fuel injector. With the present arrangement, the engine rotational speed is suppressed by cutting the fuel injection by the fuel injector. Engine rotational speed hunting occurs readily when such injection cutting control is performed. Despite this, the second clutch position control can prevent the engine rotational speed hunting from having a large influence on the clutch position control and therefore the clutch behavior can be stabilized and adverse influence on the engine and the clutch can be avoided.

In a preferred embodiment of the present invention, the clutch position control unit is programmed to end the second clutch position control and transition to the first clutch position control after a predetermined time after the rotational speed control unit ends the rotational speed suppression control.

With the present arrangement, whereas the second clutch position control is started when the rotational speed suppression control is started, the second clutch position control is ended when the predetermined time elapses from the ending of the rotational speed suppression control. Adverse influence due to engine rotational speed hunting due to the rotational speed suppression control can thereby suppressed more reliably.

For example, fuel supply cutting control or other rotational speed suppression control may be switched between being enabled and disabled at a short cycle. If the second clutch position control is switched between being enabled and disabled accordingly, the engine rotational speed hunting may have an influence after all. Therefore by, continuing the second clutch position control for the predetermined time even when the rotational speed suppression control ends, the influence of engine rotational speed hunting can be suppressed more reliably.

In a preferred embodiment of the present invention, the rotational speed control unit is programmed to set a determination flag when the engine rotational speed suppression condition is met and the clutch position control unit is programmed to judge that the rotational speed suppression control is being executed when the determination flag is set.

With the present arrangement, the second clutch position control can be started and ended appropriately by using the determination flag that expresses that the engine rotational speed condition is met.

In a preferred embodiment of the present invention, the second clutch position control includes position control of the clutch in accordance with filtered engine rotation information.

With the present arrangement, by using the filtered engine rotation information, the second clutch position control is made lower in response to the engine rotation information than the first clutch position control. More specifically, the filtering may be a process of dulling a change of the engine rotation information. Even more specifically, it is preferable for a predetermined filtering process, arranged to dull the change of the engine rotation information, to be performed on the engine rotation information used in the second clutch position control and an equal or corresponding filtering process not to be performed on the engine rotation information used in the first clutch position control.

In addition to the case of using the filtered engine rotation information, examples of the second position control also include a control where, while using engine rotation information equal to that used in the first clutch position control, a clutch position displacement speed is made lower with respect to the engine rotation information than in the case of the first clutch position control.

In a preferred embodiment of the present invention, the filtering includes a process of determining a calculated value using engine rotation information at different time points within a predetermined time.

A moving average value is an example of the calculated value. More specifically, engine rotation information may be acquired at each control cycle within the predetermined time up to the current time and a moving average value of the engine rotation information may be used as the filtered value. In this case, the filtering is a so-called low-pass filtering process and a calculated value with which the change in time of the engine rotation information is dulled is obtained. The predetermined time may be the time from the start of operation of the engine to the current time or may be a fixed time up to the current time.

In a preferred embodiment of the present invention, the second clutch position control includes an ending process of ending the second clutch position control upon gradually weakening the filtering.

With the present arrangement, the second clutch position control can be ended gradually by gradually relaxing the filtering. Transition from the second clutch position control to the first clutch position control can thereby be performed in a continuous manner without gaps. Adverse influence on the clutch and the engine can thus be avoided, and additionally, machinery of satisfactory feeling can be provided.

In a preferred embodiment of the present invention, the second clutch position control includes a clutch disengage control of controlling the clutch to a disengagement position, without dependence on the engine control information, when a clutch engagement prohibition condition is met.

With the present arrangement, when the rotational speed suppression control is being executed and the clutch engagement prohibition condition is met, the clutch is controlled to the disengagement position and therefore the driving force of the engine is not transmitted to the actuated portion. The actuated portion is thus maintained in a non-actuated state. Unstable clutch behavior due to engine rotational speed hunting can thereby be avoided and adverse influence on the engine and clutch can be avoided.

When, for example in a case where the present preferred embodiment is applied to a vehicle in which the driving force of the engine is transmitted to the vehicle wheel as the actuated portion, the clutch engagement prohibition condition is met, the transmission of the driving force to the vehicle wheel is prohibited and starting of the vehicle is prohibited. In this case, the clutch disengagement prohibition condition may be called a start prohibition condition.

In a preferred embodiment of the present invention, the second clutch position control includes a clutch disengage control of controlling the clutch to a disengagement position if a clutch engagement prohibition condition is met and a clutch engage control of controlling the clutch position in accordance with the filtered engine rotation information if the clutch engagement prohibition condition is not met.

With the present arrangement, when the rotational speed suppression control is being executed, the clutch disengage control or the clutch engage control, using the filtered engine rotation information, is performed according to whether or not the clutch engagement prohibition condition is met. Appropriate clutch control that is in accordance with the circumstances of variation (hunting) of the engine rotational speed can thereby be performed and the driving force of the engine can thus be transmitted to the actuated portion appropriately while suppressing loads on the engine and the clutch.

For example, when a clutch position control using the filtered engine rotation information is performed when the engine rotational speed is low, engine stall may occur. In such a case, by performing the clutch disengage control, engine stall can be avoided and application of excessive loads on the engine and the clutch can be suppressed at the same time.

In a preferred embodiment of the present invention, the clutch engagement prohibition condition includes that the engine rotational speed is less than a predetermined rotational speed.

With the present arrangement, engagement of the clutch is prohibited when the engine rotational speed is less than the predetermined rotational speed and therefore the clutch can be controlled to be in the disengaged state when the engine is rotating at low speed and engine rotational speed hunting is occurring. Engine stall can thereby be avoided and application of excessive loads on the engine and the clutch can thereby be avoided.

In a preferred embodiment of the present invention, the engine rotational speed suppression condition includes a plurality of types of conditions and the clutch engagement prohibition condition includes that a predetermined type of engine rotational speed suppression condition is met. With the present arrangement, the rotational speed suppression control is executed in response to each of a plurality of types of engine rotational speed suppression conditions. On the other hand, if the predetermined type of engine rotational speed suppression condition among the conditions is met, the clutch is controlled to be in the disengaged state. The clutch can thus be controlled to be in the disengaged state only when the rotational speed suppression control that requires clutch disengagement is being performed.

In a preferred embodiment of the present invention, the second clutch position control ends the clutch disengage control if, during execution of the clutch disengage control, the engine rotational speed becomes less than a predetermined value with a throttle opening being fully closed.

With the present arrangement, the condition for ending the clutch disengage control is that the engine rotational speed becomes less than the predetermined value with the throttle opening being fully closed. Therefore, when the throttle opening is not fully closed or the engine rotational speed is not less than the predetermined value, the clutch is maintained in the disengaged state and therefore inadvertent engagement of the clutch under circumstances where the engine may generate a large driving force can be avoided. That is, clutch engagement is allowed when an output of the engine becomes low and therefore a large driving force is not transmitted inadvertently to the actuated portion.

For example, in a case where the present preferred embodiment is applied to a vehicle, the clutch disengage control is not ended when the throttle opening is comparatively large or the engine rotational speed is comparatively high and therefore the vehicle will not start suddenly.

In a preferred embodiment of the present invention, the clutch control system is arranged to be included in a vehicle capable of switching between actuation and non-actuation of a differential lock, and the engine rotational speed suppression condition includes that switching between actuation and non-actuation of the differential lock is in progress.

With the present arrangement, while switching between actuation and non-actuation of the differential lock is in progress, the rotational speed suppression control is performed to restrict a vehicle speed to a low speed (for example, not more than 10 to 15 km/h). For example, with an arrangement in which a differential lock is attained by engagement of dogs, the vehicle wheel may have to be rotated to a position at which the dogs engage mutually. In such a case, the rotational speed suppression control is executed to allow only movement at low speed. Engine rotational speed hunting may thus occur during clutch engagement. The second clutch position control, which is made low in response to the engine rotation information, is thus executed. The behavior of the clutch can thereby be stabilized, and influence of engine rotational speed hunting on the clutch and the engine can thereby be suppressed.

In a preferred embodiment of the present invention, the engine rotational speed suppression condition includes that the engine rotational speed has reached a limit rotational speed associated with an oil pressure of the engine. When the oil pressure of the engine decreases, the engine rotational speed is suppressed for the purpose of protecting the engine. Adverse influence on the clutch and the engine due to engine rotational speed hunting can be suppressed in such a case.

In a preferred embodiment of the present invention, the engine rotational speed suppression condition includes that the engine rotational speed has reached a limit rotational speed associated with a temperature of cooling water for cooling the engine. In a period in which the temperature of the cooling water is low and therefore the engine temperature is low, the engine rotational speed is suppressed for the purpose of protecting the engine. Adverse influence on the clutch and the engine due to engine rotational speed hunting can be suppressed in such a case.

In a preferred embodiment of the present invention, the engine rotational speed suppression condition includes a plurality of types of conditions and the second clutch position control includes a clutch position control that differs according to the engine rotational speed suppression condition that is met. Appropriate clutch position control can thereby be performed in accordance with the engine rotational speed suppression condition that is met. More appropriate clutch position control is thereby made possible, and machinery, with which protection of the clutch and the engine and satisfactory actuation characteristics can be realized at the same time, can be provided.

The clutch control system according to a preferred embodiment of the present invention includes a hunting determining unit determining whether or not a hunting condition, under which hunting occurs in the engine rotational speed of the engine, is met, and a clutch position control unit programmed to execute a first clutch position control, which is in accordance with engine rotation information, on the clutch if the hunting determining unit determines that the hunting condition is not met and to execute a second clutch position control, which is lower in response to the engine rotation information than the first clutch position control, on the clutch if the hunting determining unit determines that the hunting condition is met.

With the present arrangement, whether or not hunting will occur in the engine rotational speed is determined and the first clutch position control or the second clutch position control is performed in accordance with the determination result. The second clutch position control that is performed when there is a possibility of occurrence of hunting is low in response to the engine rotation information and therefore engine rotational speed hunting will not influence the clutch position control greatly. The clutch behavior can thus be suppressed and adverse influence on the engine and the clutch can be suppressed.

The clutch control system according to a preferred embodiment of the present invention further includes a rotational speed control unit programmed to execute a rotational speed suppression control of suppressing the engine rotational speed of the engine when a predetermined engine rotational speed suppression condition is met, and the hunting determining unit determines that the hunting condition is met when the rotational speed control unit is executing the rotational speed suppression control and determines that the hunting condition is not met when the rotational speed control unit is not executing the rotational speed suppression control.

With the present arrangement, when the rotational speed suppression control is being executed, it is determined that the hunting condition is met and the second clutch position control of low response is performed. Therefore when hunting is occurring in the engine rotational speed due to the rotational speed suppression control, it can be prevented from greatly influencing the clutch position control. The clutch behavior can thereby be stabilized and the engine and the clutch can be protected.

In a preferred embodiment of the present invention, the hunting determining unit is arranged to determine whether or not hunting is actually occurring in the engine rotational speed and to determine that the hunting condition is met when hunting is actually occurring in the engine rotational speed.

With the present arrangement, if hunting is actually occurring in the engine rotational speed, the second clutch position control of low response is executed. Excessive loads on the engine and the clutch due to engine rotational speed hunting can thereby be avoided.

The clutch control system according to a preferred embodiment of the present invention further includes a rotational speed control unit programmed to execute a rotational speed suppression control of suppressing the engine rotational speed of the engine when a predetermined engine rotational speed suppression condition is met, and the hunting determining unit is arranged to determine that the hunting condition is met when the rotational speed control unit is executing the rotational speed suppression control and hunting is actually occurring in the engine rotational speed.

With the present arrangement, the first clutch position control of high response is executed even during execution of the rotational speed suppression control as long as hunting is actually not occurring in the engine rotational speed. Execution of the second clutch position control of low response can thus be limited to only when it is required and therefore machinery that is excellent in operation characteristics can be provided while realizing protection of the engine and the clutch.

In a preferred embodiment of the present invention, the hunting determining unit determines that hunting is actually occurring in the engine rotational speed if the engine rotational speed increases and decreases (that is, the sign of the rotational acceleration becomes inverted) within a predetermined time. With the present arrangement, engine rotational speed hunting can be judged appropriately and therefore machinery that is excellent in operation characteristics can be provided while realizing protection of the engine and the clutch.

In a preferred embodiment of the present invention, the hunting determining unit determines that hunting is actually occurring in the engine rotational speed if increase and decrease of the engine rotational speed occur for not less than a predetermined number of times within a predetermined time. With the present arrangement, engine rotational speed hunting can be judged appropriately and therefore machinery that is excellent in operation characteristics can be provided while realizing protection of the engine and the clutch.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 12 is a time chart for describing an operation example by the clutch position control of FIG. 11.

FIG. 13A and FIG. 13B are flowcharts for describing a clutch position control according to a second preferred embodiment of the present invention.

DETAILED DESCRIPTION OF THE PREFERRED EMBODIMENTS

The form and application of a vehicle to which preferred embodiments of the present invention are applied are not restricted in particular. One category of vehicles with which the preferred embodiments of the present invention are especially useful is the category of utility vehicles. The preferred embodiments of the present invention are particularly useful in four-wheel-drive, all-terrain vehicles called "recreational off-highway vehicles." A utility vehicle may be used for travel on rough terrain. With a vehicle of such a category, there are cases where it is desired to step on an accelerator to rapidly increase an engine rotational speed while performing low-speed travel on a steeply sloping road.

Figure 1:
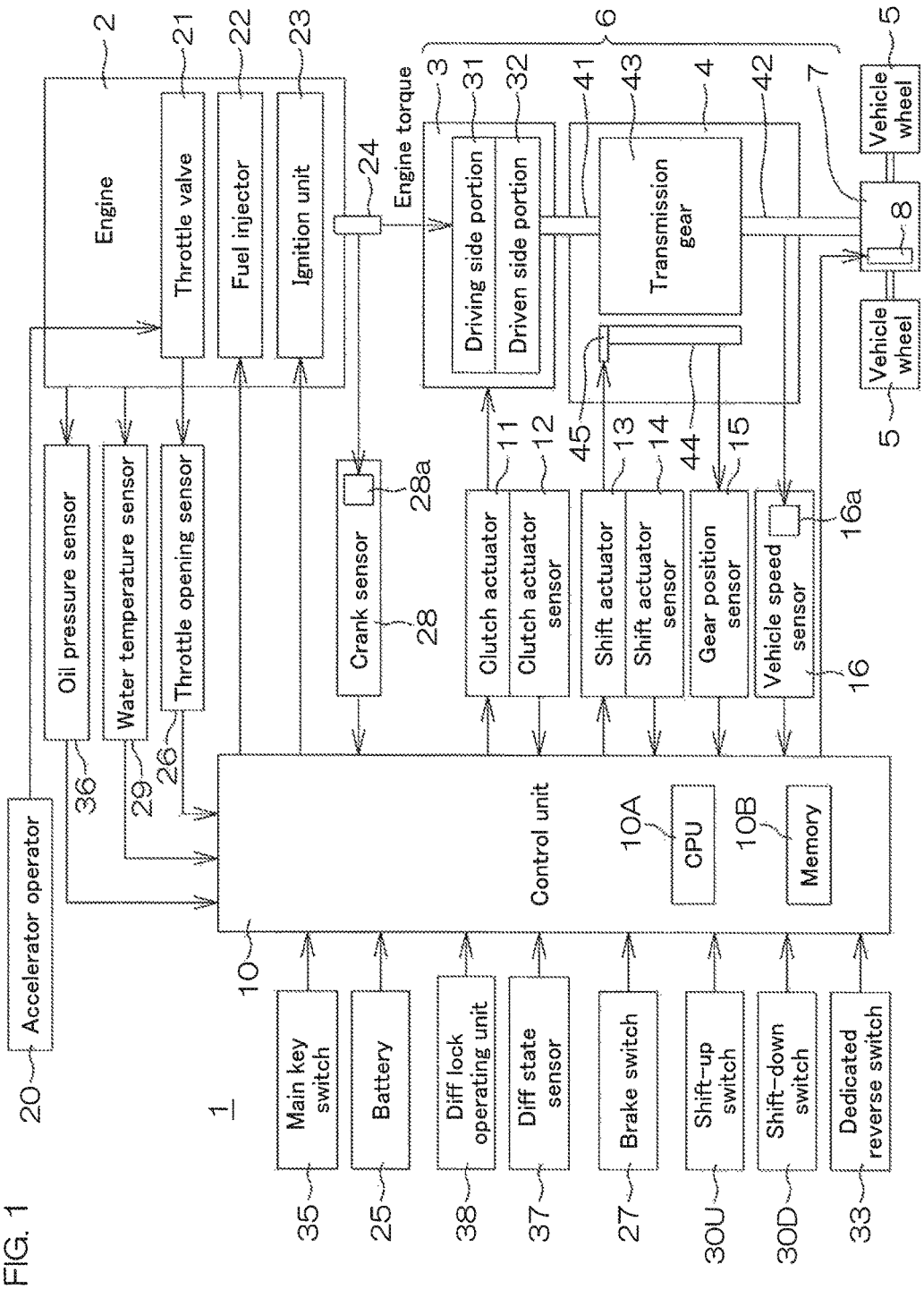
FIG. 1 is a block diagram of the arrangement of principal portions of a vehicle that includes a clutch control system according to a preferred embodiment of the present invention.

FIG. 1 is a block diagram of the arrangement of principal portions of a vehicle 1 that includes a clutch control system according to a preferred embodiment of the present invention. The vehicle 1 includes an engine (internal combustion engine) 2, a clutch 3, a transmission 4, and a vehicle wheel 5.

The vehicle wheels 5 are actuated portions that are driven by a driving force of the engine 2. For example, four vehicle wheels 5 are provided, including right and left front wheels and right and left rear wheels. Only two vehicle wheels 5 that are disposed opposite each other at right and left sides are shown in FIG. 1. The two vehicle wheels 5 may, for example, be right and left front wheels. In the present preferred embodiment, a differential gear 7, which allows there to be a rotational difference between the right and left front wheels 5, is disposed between the wheels.

A driving force generated by the engine 2 is transmitted to the four vehicle wheels 5, for example, via a power transmission path 6. The clutch 3, the transmission 4 and the differential gear 7 are disposed in the power transmission path 6. In the present preferred embodiment, the clutch 3 is disposed between the engine 2 and the transmission 4.

The differential gear 7 includes a diff lock unit 8. The diff lock unit 8 may be a selectable locker with which the differential gear 7 is switched between a released state and a locked state by operation from a driver's seat. The released state is a state in which differential rotation of the right and left vehicle wheels 5 is allowed and is a state in which the diff lock unit 8 is not actuated. The locked state is a state in which the differential rotation of the right and left vehicle wheels 5 is prohibited and is a state in which the diff lock unit 8 is actuated.

The engine 2 includes a throttle valve 21, a fuel injector 22, and an ignition unit 23. An accelerator operator 20, operated by a driver, is coupled to the throttle valve 21. There is thus a correspondence between the operation amount of the accelerator operator 20 (accelerator opening degree) and a throttle opening degree. The accelerator operator 20 may be an accelerator pedal. The fuel injector 22 injects fuel of an injection amount set according to the accelerator opening degree, etc., into the engine 2. The ignition unit 23 generates a spark discharge inside the engine 2 at a predetermined ignition timing in an engine cycle to ignite a mixed gas of the fuel and air.

The clutch 3 includes a driving side portion 31 and a driven side portion 32, and the driving side portion 31 and the driven side portion 32 are arranged to approach and separate from each other. A torque (engine torque) generated by the engine 2 is input into the driving side portion 31. More specifically, rotation of a crankshaft 24 of the engine 2 is transmitted to the driving side portion 31. A reduction gear may be provided between the crankshaft 24 and driving side portion 31. The driven side portion 32 is coupled to a main shaft 41 of the transmission 4.

The transmission 4 includes the main shaft 41, a drive shaft 42, a plurality of transmission gears 43, a shift cam 44, and a shifter 45. The plurality of transmission gears 43 can be positioned at a plurality of gear positions. The plurality of gear positions include at least one forward gear position and at least one reverse gear position. Rotation of the main shaft 41 is converted to rotation of a shift ratio and direction that are in accordance with the gear position, and transmitted to the drive shaft 42. The drive shaft 42 is mechanically coupled to the vehicle wheel 5. The shifter 45 is an operating member that operates the shift cam 44. The positioning of the transmission gears 43 can be changed by displacement (for example, rotational displacement) of the shift cam 44, and the gear position can be selected thereby.

The vehicle 1 further includes a clutch actuator 11, a shift actuator 13, and a control unit 10. The control unit 10 is programmed to control the clutch actuator 11 and the shift actuator 13. The actuators 11 and 13 may be electric actuators or hydraulic actuators. The control unit 10 includes a processor (CPU) 10A and a memory 10B. The processor 10A executes a program stored in the memory 10B, whereby the control unit 10 acts as a plurality of functional units as described later.

The control unit 10 in some embodiments may be implemented as a general-purpose digital signal processor or dedicated signal processing circuit. In some embodiments, the control unit 10 may be a single processor. Such a single processor executes pre-loaded computer program to perform various processes; by performing the processes simultaneously or sequentially, the processor functions as different components; each function of the processor implemented by such a process is described as a separate unit. The control unit 10 may include several processors which operate similarly to the processor described above. The control unit 10 may include integrated circuit devices and memories mounted on a substrate or substrates. Further, the control unit 10 may be part of a computer which has other functional blocks. It will be understood that other units may be similarly formed to as described above.

The clutch actuator 11 makes the driving side portion 31 and the driven side portion 32 of the clutch 3 approach and separate from each other. The clutch actuator 11 is further arranged to increase and decrease a mutual pressing force of the driving side portion 31 and the driven side portion 32 in a state where these are in contact. The driving side portion 31 and the driven side portion 32 are thereby put in frictional contact and a torque transmitted therebetween is increased and decreased.

The clutch 3 is capable of taking on a disengaged state, an engaged state, and a half-clutch state. In the disengaged state, the driving side portion 31 and the driven side portion 32 are disengaged from each other and torque is not transmitted therebetween. In the engaged state, the driving side portion 31 and the driven side portion 32 are coupled without sliding and torque is transmitted therebetween. The half-clutch state is an intermediate state between the engaged state and the disengaged state. In the half-clutch state, the driving side portion 31 and the driven side portion 32 are in sliding contact with each other and torque is transmitted partially therebetween. By controlling the clutch actuator 11, the state of the clutch 3 can be changed among the disengaged state, half-clutch state, and engaged state, and the pressing force of the driving side portion 31 and the driven side portion 32 in the half-clutch state can be changed.

A clutch actuator sensor 12 is provided to detect a position of an actuating element of the clutch actuator 11. The position of the actuating element of the clutch actuator 11 corresponds to a distance between the driving side portion 31 and the driven side portion 32 of the clutch. In the state where the driving side portion 31 and the driven side portion 32 are in contact, the distance corresponds to the pressing force of the driving side portion 31 and the driven side portion 32.

In the following description, a "clutch pressing amount" shall be introduced as a parameter for collectively referring to the distance between the driving side portion 31 and the driven side portion 32 and the pressing force therebetween. The clutch pressing amount is smaller the larger the distance of the driving side portion 31 and the driven side portion 32 and is larger the smaller the distance. In the state where the driving side portion 31 and the driven side portion 32 are in contact, the greater the mutual pressing force, the greater the clutch pressing amount.

Specifically, the clutch pressing amount corresponds to the distance between the driving side portion 31 and the driven side portion 32 and more specifically corresponds to a displacement amount of the actuating element of the clutch actuator 11. The control unit 10 drives the clutch actuator 11 based on an output signal of the clutch actuator sensor 12 to control the clutch pressing amount. The clutch pressing amount expresses a relative position of the driving side portion 31 and the driven side portion 32 and in the present specification, control of the clutch pressing amount may be referred to in some cases as "clutch position control."

The shift actuator 13 actuates the shifter 45 to operate the shift cam 44 and thereby executes a shift operation for changing the gear position. A shift actuator sensor 14 is provided to detect a position of an actuating element of the shift actuator 13. The position of the actuating element of the shift actuator 13 corresponds to a position of the shifter 45. The control unit 10 controls the shift actuator 13 based on an output signal from the shift actuator sensor 14.

The transmission 4 includes a gear position sensor 15 that detects the gear position and a vehicle speed sensor 16 that detects a vehicle speed. Output signals of these sensors are input into the control unit 10.

The gear position sensor 15 detects the gear position of the transmission 4. Specifically, the gear position sensor 15 may be a sensor that detects a position (for example, a rotational position) of the shift cam 44.

The vehicle speed sensor 16 detects a rotational speed of the vehicle wheel 5. For example, the vehicle speed sensor 16 may be a sensor that detects a rotational speed of the drive shaft 42. The rotational speed of the drive shaft 42 is proportional to the rotational speed of the vehicle wheel 5 and the rotational speed of the vehicle wheel 5 can thus be detected by detecting the rotational speed of the drive shaft 42. The rotational speed of the vehicle wheel 5 corresponds to the vehicle speed and the rotational speed of the drive shaft 42 can thus be used as an index that expresses the vehicle speed. The rotational speed of the drive shaft 42 and a rotational speed of the driven side portion 32 of the clutch 3 are in a correspondence based on a transmission gear ratio at the transmission 4. The vehicle speed sensor 16 that detects the rotational speed of the drive shaft 42 is thus an example of a rotational speed detecting unit that detects a driven side rotational speed that is the rotational speed of the driven side portion 32.

More specifically, the vehicle speed sensor 16 includes a rotational pulse generating unit 16a that generates, in accordance with the rotation of the drive shaft 42, rotational pulses that are not related to rotational direction but are in accordance with rotational amount. The rotational pulses generated by the rotational pulse generating unit 16a are input into the control unit 10. The control unit 10 may, for example, count the rotational pulses input per unit time and calculate the vehicle speed based on the counting result. Also, the control unit 10 may measure a duration required for input of a plurality of rotational pulses of a predetermined number and calculate the vehicle speed based on the measured duration.

A main key switch 35, a battery 25, a throttle opening degree sensor 26, a brake switch 27, a crank sensor 28, a water temperature sensor 29, an oil pressure sensor 36, a diff state sensor 37, a shift-up switch 30U, a shift-down switch 30D, a dedicated reverse switch 33, a diff lock operating unit 38, etc., are connected to the control unit 10.

The main key switch 35 is a key switch with which a conduct/interrupt operation using a main key is performed to turn on power to the vehicle 1. The battery 25 supplies electric power to the control unit 10 and other electric components. The control unit 10 monitors a voltage of the battery 25.

The throttle opening degree sensor 26 detects the throttle opening degree of the engine 2. The accelerator operator 20 is coupled to the throttle valve 21 of the engine 2 and therefore there is a correspondence between an operation amount (accelerator opening degree) of the accelerator operator 20 and the throttle opening degree. The throttle opening degree sensor 26 thus also functions as an accelerator opening degree sensor that detects the operation amount of the accelerator operator 20. The water temperature sensor 29 detects a temperature of cooling water of the engine 2. The oil pressure sensor 36 detects a pressure of engine oil.

The crank sensor 28 is a sensor that detects the rotation of the crankshaft 24 of the engine 2. The crank sensor 28 includes, for example, a rotational pulse generating unit 28a that generates, in accordance with the rotation of the crankshaft 24, rotational pulses that are not related to its rotational direction but are in accordance with its rotational amount. The control unit 10 determines an engine rotational speed based on the rotational pulses generated by the crank sensor 28. The engine rotational speed is a value corresponding to a rotational speed of the driving side portion 31 of the clutch 3. The clutch sensor 28 is thus an example of a rotational speed detecting unit that detects a driving side rotational speed that is the rotational speed of the driving side portion 31.

A diff state sensor 37 is a sensor that detects whether the differential gear 7 is in the released state or the locked state. A diff lock operating unit 38 is disposed at the driver's seat of the vehicle 1 and is an operating unit that is operated by the driver. When the diff lock operating unit 38 is operated, the control unit 10 actuates the diff lock unit 8 to switch the differential gear 7 between the released state and the locked state.

The shift-up switch 30U is a switch that is operated by the driver to shift the gear position (shift stage) of the transmission 4 one stage to a higher speed side. The shift-down switch 30D is a switch that is operated by the driver to shift the gear position (shift stage) of the transmission 4 one stage to a lower speed side. Output signals of the shift switches 30U and 30D are input into the control unit 10. In accordance with the input from the shift switch 30U or 30D, the control unit 10 drives the clutch actuator 11 and the shift actuator 13 to perform a shifting operation and change the gear position (shift position) among a plurality of forward gear positions.

The dedicated reverse switch 33 is a switch that is operated by the driver to select the reverse gear position of the transmission 4. When the dedicated reverse switch 33 is operated when the vehicle 1 is in a stopped state, the control unit 10 controls the clutch actuator 11 and the shift actuator 13 to change the gear position of the transmission 4 to the reverse position.

The vehicle 1 includes a semi-automatic transmission, with which, while the driver performs a shifting operation, clutch operation is left up to automatic control by the control unit 10.

To start the vehicle 1, the driver operates the shift switch 30U or 30D or the dedicated reverse switch 33 to select a gear position other than neutral. The control unit 10 thereby drives the shift actuator 13 to change the positioning of the transmission gears 43 of the transmission 4 to the selected gear position. The driver further operates the accelerator operator 20 to increase the accelerator opening degree. When the throttle opening degree increases accordingly, the engine rotational speed increases. In accordance with the increase of engine rotational speed, the control unit 10 controls the clutch actuator 11 to increase the clutch pressing amount and makes the driving side portion 31 and the driven side portion 32 approach each other.

The control unit 10 sets a target engine rotational speed that is in accordance with the throttle opening degree and controls the clutch pressing amount so that the engine rotational speed increases toward the target engine rotational speed. The mutual pressing force of the driving side portion 31 and the driven side portion 32 thereby increases gradually and the clutch 3 enters the engaged state via the half-clutch state from the disengaged state.

The torque generated by the engine 2 is thus transmitted to the transmission 4 via the clutch 3. The rotation shifted by the transmission 4 is further transmitted to the vehicle wheel 5 via the differential gear 7 and thereby the vehicle 1 moves. After the clutch 3 has entered the engaged state, the control unit 10 executes control (fuel injection control) of the fuel injection valve 22 and control (ignition control) of the ignition unit 23 so that an engine output that is in accordance with the throttle opening degree is obtained.

When during travel, the driver operates the shift-up switch 30U or the shift-down switch 30D, a shift command is input into the control unit 10. In response thereto, the control unit 10 executes the shift operation. Specifically, the control unit 10 controls the clutch actuator 11 to disengage the clutch 3. Further, the control unit 10 controls the shift actuator 13 to change the positioning of the transmission gears 43 to the selected gear position corresponding to the shift command. Thereafter, the control unit 10 controls the clutch actuator 11 to put the clutch 3 in the engaged state via the half-clutch state. When the clutch 3 enters the engaged state and the shift operation is completed, the control unit 10 executes the fuel injection control and the ignition control so that the engine output corresponding to the throttle opening degree is obtained.

If when the clutch 3 is in the engaged state, the vehicle speed falls below a shift-down threshold that is set in advance for each gear position, the control unit 10 executes an automatic shift-down control. More specifically, if the vehicle speed falls below a clutch disengage threshold determined for each shift stage, the control unit 10 controls the clutch actuator 11 to put the clutch 3 in the disengaged state. If the vehicle speed then falls below the shift-down threshold, the control unit 10 controls the shift actuator 13 to change the gear position so as to lower the shift stage by one stage. If the vehicle speed further falls below the shift-down threshold corresponding to the shift stage after the downward shift, the control unit 10 changes the gear position to lower the shift stage further by one stage. Thereafter, the control unit 10 controls the clutch actuator 11 to put the clutch 3 in the engaged state via the half-clutch state. When the clutch 3 enters the engaged state and the shift operation is completed, the control unit 10 executes the fuel injection control and the ignition control so that the engine output corresponding to the throttle opening degree is obtained.

If when the shift stage is at the lowest stage, the vehicle speed falls below the clutch disengage threshold corresponding to the lowest stage, the control unit 10 disengages the clutch 3. More specifically, if, in a state where a forward gear position of the lowest stage among the plurality of forward gear positions is selected, the vehicle speed falls below the clutch disengage threshold, the clutch 3 is disengaged. The same applies to reverse gear positions. If there is just one reverse gear position, the clutch 3 is disengaged when the vehicle speed falls below the clutch disengage threshold corresponding to the reverse gear position.

The control unit 10 has a function as a rotational speed control unit. That is, for the purpose of restricting the vehicle speed and protecting the engine 2, the control unit 10 is programmed to execute a rotational speed suppression control to suppress the rotational speed of the engine 2 when a predetermined engine rotational speed suppression condition is met. Specifically, control unit 10 performs an ignition cutting control of cutting ignition by the ignition unit 23 or an injection cutting control of cutting fuel injection by the fuel injector 22 to suppress the engine rotational speed. Although the rotational speed suppression control by the injection cutting control shall mainly be described below, the rotational speed suppression control may be performed by one of either or both of the ignition cutting control and injection cutting control. The injection cutting control is an example of a fuel supply cutting control of cutting the supply of fuel to the engine 2.

Examples of the engine rotational speed suppression condition are as follows:

Engine rotational speed suppression condition 1: Maximum vehicle speed restriction condition Engine rotational speed suppression condition 2: Diff lock vehicle speed restriction condition Engine rotational speed suppression condition 3: Differential switching vehicle speed restriction condition Engine rotational speed suppression condition 4: Low oil pressure engine rotational speed restriction condition Engine rotational speed suppression condition 5: Cold-engine engine rotational speed restriction condition The "maximum vehicle speed restriction condition" is a condition for restricting the vehicle speed of the vehicle 1 to not more than a maximum speed (for example, 100 to 130 km/h). The maximum vehicle speed restriction condition is met when the vehicle speed reaches the set maximum speed.

The "diff lock vehicle speed restriction condition" is a condition for restricting the vehicle speed of the vehicle 1 to not more than a restriction vehicle speed (for example, 70 km/h) when the differential gear 7 is in the locked state (when diff locked). The diff lock vehicle speed restriction condition is met when the vehicle speed reaches the set restriction vehicle speed with the differential gear 7 being in the locked state.

The "differential switching vehicle speed restriction condition" is a condition for restricting the vehicle speed of the vehicle 1 to not more than a restriction vehicle speed (for example, 5 to 10 km/h) while the diff lock unit 8 is being actuated to switch the differential gear 7 between the release state and the locked state. The differential switching vehicle speed restriction condition is met when the vehicle speed reaches the set restriction vehicle speed while the diff lock unit 8 is in the process of performing the switching operation. As a rule, the diff lock unit 8 is actuated when the vehicle speed is zero. However, if the diff lock unit 8 has an arrangement in which the differential gear 7 is put in the locked state by engagement of dogs, the vehicle wheels 5 may have to be rotated to a position at which the dogs engage mutually. In such a case, only movement at low speed is allowed.

The "low oil pressure engine rotational speed restriction condition" is a condition for restricting the engine rotational speed to not more than a restriction rotational speed (for example, 2000 to 3000 rpm) for the purpose of protecting the engine 2 when the oil pressure of the engine oil detected by the oil pressure sensor 36 is low. The low oil pressure engine rotational speed restriction condition is met when the engine rotational speed reaches the set restriction rotational speed with the oil pressure detected by the oil pressure sensor 36 being not more than a predetermined value. The restriction rotational speed may be a fixed value associated with an oil pressure not more than a predetermined value or may be a plurality of values corresponding to various oil pressure values not more than a predetermined value.

The "cold-engine engine rotational speed restriction condition" is a condition for restricting the engine rotational speed to not more than a restriction rotational speed (for example, 3000 to 6000 rpm) when the cooling water temperature detected by the water temperature sensor 29 is low, that is, when the temperature of the engine 2 is low. It is a condition for executing the rotational speed suppression control for the purpose of protecting the engine 2. For example, a restriction rotational speed that changes according to the temperature detected by the water temperature sensor 29 is set. The cold-engine engine rotational speed restriction condition is met when the engine rotational speed reaches the restriction rotational speed corresponding to the temperature of the cooling water.

Figure 2:
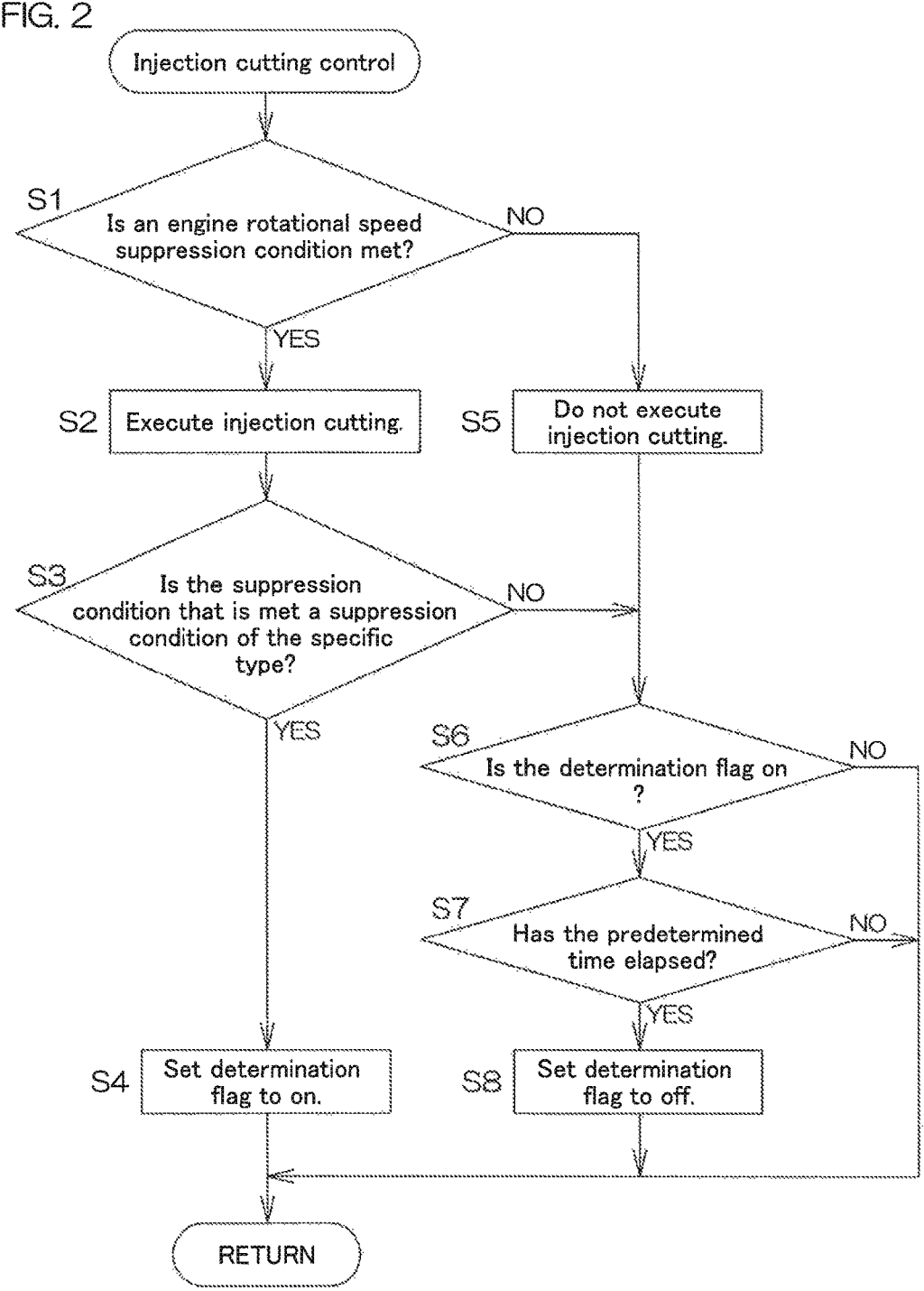
FIG. 2 is a flowchart for describing an example of an injection cutting control that is an example of a rotational speed suppression control performed in the clutch control system.

FIG. 2 is a flowchart for describing an example of the injection cutting control that is an example of the rotational speed suppression control and illustrates processes that the control unit 10 executes repeatedly at a predetermined control cycle (for example, of 10 msec).

The control unit 10 judges whether or not any of the engine rotational speed suppression conditions 1 to 5 is met (step S1). If at least one of the engine rotational speed suppression conditions 1 to 5 is met (step S1: YES), the control unit 10 executes injection cutting of cutting fuel injection by the fuel injector 22 (step S2). Further, the control unit 10 judges whether or not the engine rotational speed suppression condition that is met is an engine rotational speed suppression condition of a predetermined specific type (step S3).

Specifically, the control unit 10 judges whether or not an engine rotational speed suppression condition that may influence a clutch position control for making the vehicle 1 start is met. In other words, the control unit 10 judges whether or not the engine rotational speed suppression condition is that which is met when the engine rotational speed is in a low speed range (for example, 2000 to 3000 rpm). More specifically, it is judged whether or not the engine rotational speed suppression condition is that with which the engine rotational speed is in the low speed range and there is a high possibility for hunting to occur. Even more specifically, the control unit 10 judges whether or not at least one of engine rotational speed suppression condition 3 (differential switching vehicle speed restriction condition), engine rotational speed suppression condition 4 (low oil pressure engine rotational speed restriction condition), and engine rotational speed suppression condition 5 (cold-engine engine rotational speed restriction condition) is met. The engine rotational speed suppression conditions 3 to 5 are conditions that are possibly met in a process of performing start control on the clutch 3.

If a positive judgment is made in step S3, the control unit 10 sets a determination flag to an on state (step S4) and ends the process of the current control cycle. The determination flag is information expressing whether or not hunting that influences the clutch position control is occurring in the engine rotational speed. In the present example, the engine rotational speed suppression conditions of the specific types are an example of hunting conditions. The control unit 10 thus has a function as a hunting determining unit that determines whether or not a hunting condition is met.

On the other hand, if the engine rotational speed suppression conditions are not met (step S1: NO), the control unit 10 performs ordinary fuel injection control without executing injection cutting (step S5). Further, the control unit 10 judges whether or not the determination flag is on (step S6). If the determination flag is in the on state (step S6: YES), it is judged whether or not a duration from the point at which the determination flag became on has reached a predetermined time (for example, of 500 milliseconds) (step S7). If a positive judgement is made here, the control unit 10 sets the determination flag to the off state (step S8) and ends the process if the current control cycle. If the determination flag is off (step S6: NO), the processes of steps S7 and S8 are omitted and the determination flag is maintained in the off state. Even if the determination flag is on (step S6: YES), if the determination flag-on duration is less than the predetermined time (step S7: NO), the process of step S8 is omitted and the determination flag is maintained in the on state.

If the engine rotational speed suppression condition that is met is not a condition of the specific type (step S3: NO), the processes from step S6 are executed in the same manner as when injection cutting is not performed (step S1: NO; step S5).

Figure 3:
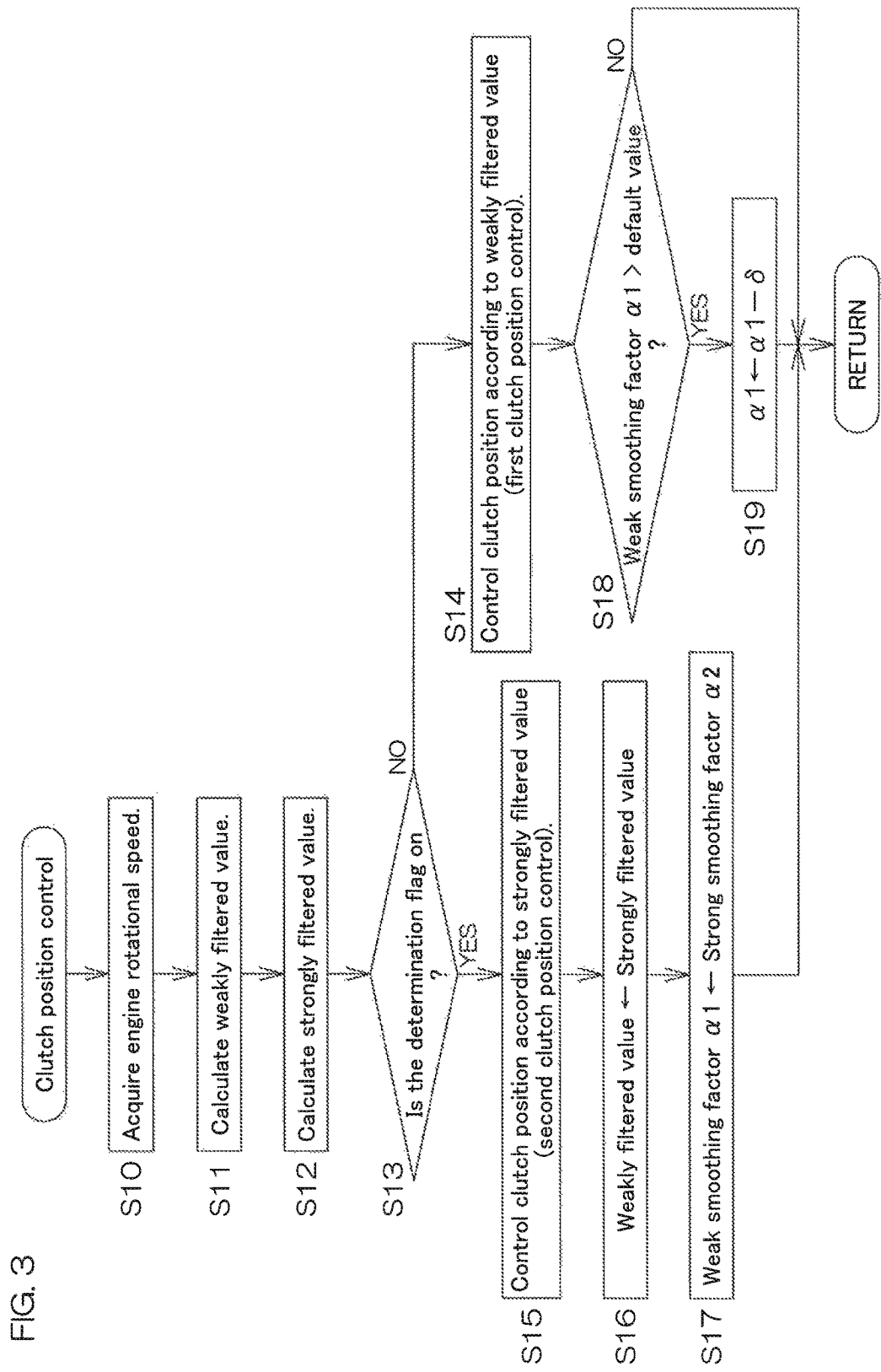
FIG. 3 is a flowchart for describing a process example related to a clutch position control.

FIG. 3 is a flowchart for describing a process example related to position control of the clutch 3 and illustrates processes that the control unit 10 executes repeatedly at a predetermined control cycle (for example, of 10 msec). The processes correspond to a function of the control unit 10 as a clutch position control unit.

The control unit 10 determines the engine rotational speed based on the output signal of the crank sensor 28 (step S10). Further, the control unit 10 calculates a weakly filtered value, which is a value calculated by applying weak filtering to the engine rotational speed, and a strongly filtered value, which is a value calculated by applying strong filtering to the engine rotational speed (steps S11 and S12). In regard to the order of calculation, either value may be calculated before the other.

The filtering is, specifically, a low-pass filtering process and is a smoothing process performed on the engine rotational speed. That is, the filtered value is a calculated value with which the change with time of the engine rotational speed is dulled. More specifically, a moving average value Ne_ave(n) obtained by a formula (1) shown below may be used as the filtered value. The moving average value Ne_ave (n) is a value calculated using engine rotational speeds at different time points within a period from the start of operation of the engine 2 to the current time.

$$Ne\_ave(n)=Ne(n)-(Ne(n)-Ne\_ave(n-1))\times\alpha \quad (1)$$

Ne(n): Engine rotational speed of the current control cycle

Ne_ave(n): Filtered value (smoothened engine rotational speed value) of the current control cycle Ne_ave(n−1): Filtered value (smoothened engine rotational speed value) of the previous control cycle α: smoothing factor. Here, 0<α<1.

The control unit 10 uses a weak smoothing factor α1 as the smoothing factor α to perform the calculation of formula (1) to determine the weakly filtered value (step S11). Also, the control unit 10 uses a strong smoothing factor α2 (α2>α1) as the smoothing factor α to perform the calculation of formula (1) to determine the strongly filtered value (step S12).

The control unit 10 judges whether or not the determination flag described above (see FIG. 2) is on (step 13). If the determination flag is off (step S13: NO), that is, if the possibility that hunting is occurring in the engine rotational speed is low, the control unit 10 performs a first clutch position control, which is a position control of the clutch 3 using the weakly filtered value (step S14). On the other hand, if the determination flag is on (step S13: YES), that is, if there is a possibility that hunting is occurring in the engine rotational speed, the control unit 10 performs a second clutch position control, which is a position control of the clutch 3 using the strongly filtered value (step S15). In this case, in preparation to end the second clutch position control and transition to the first clutch position control, the control unit 10 substitutes the strongly filtered value in the weakly filtered value (step S16) and further substitutes the strong smoothing factor α2 in the weak smoothing factor α1 (step S17).

After the first clutch position control (step S14), the control unit 10 judges whether or not the weak smoothing factor α1 is greater than a default value (step S18) and if it is greater than the default value, a minute constant δ (>0) is subtracted therefrom and the resulting value is used as the new weak smoothing factor α1 (step S19). If the weak smoothing factor α1 is not more than the default value, the weak smoothing factor α1 is kept at the same value. The processes of steps S18 and S19 are processes for gradual transition from a strongly filtered value to a weakly filtered value. In other words, these are ending processes that gradually relax the filtering to end the second clutch position control.

In FIG. 3 and the description related thereto, the process of step S14 is referred to as the "first clutch position control" for the sake of convenience. However, the "first clutch position control" in the strict sense is a clutch position control using the weakly filtered value obtained with the weak smoothing factor α1 being the default value. That is, the clutch position control using the weakly filtered value determined with the weak smoothing factor α1 being a value greater than the default value is an "ending process" that is included in the second clutch position control.

Figure 4:
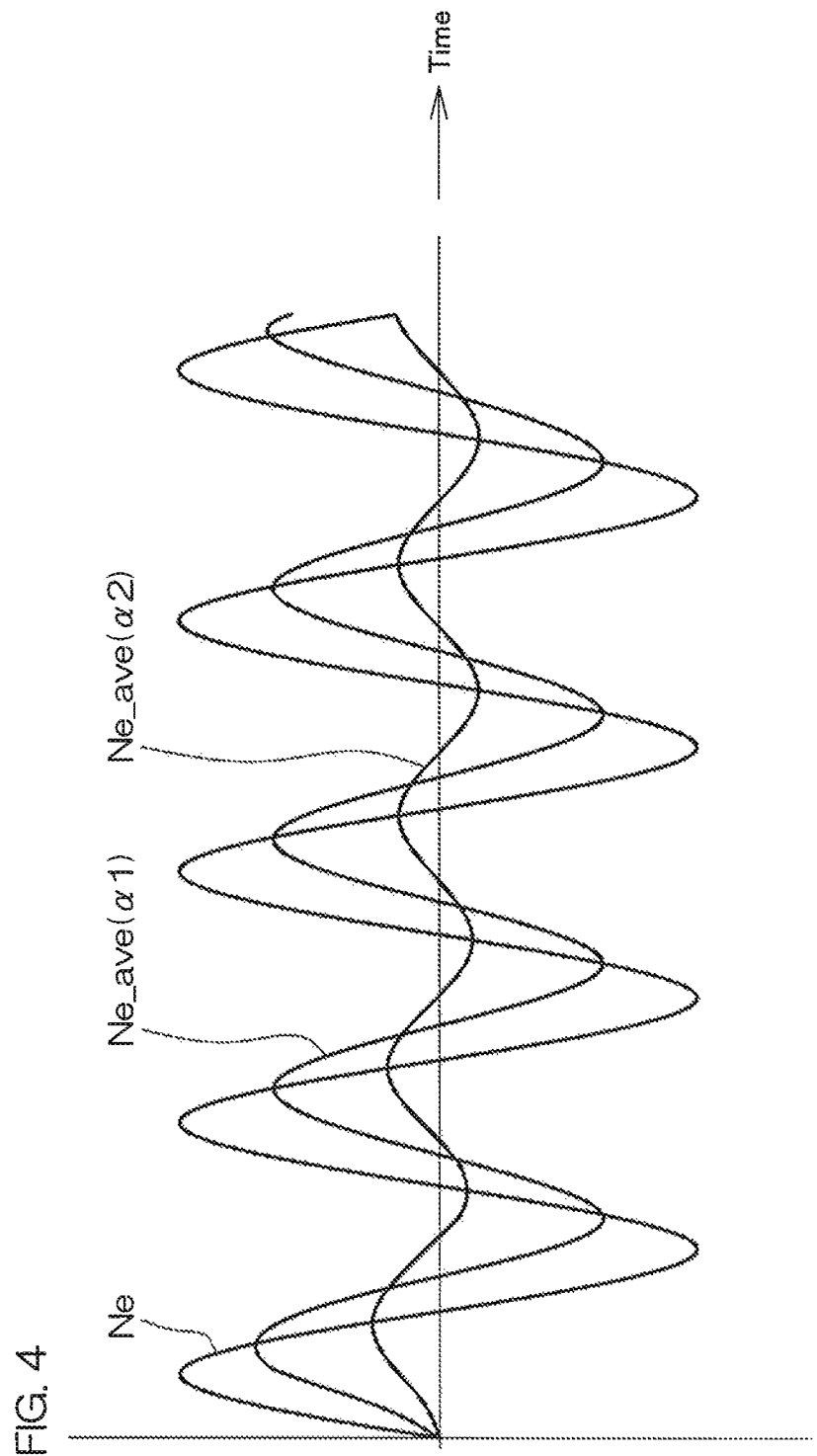
FIG. 4 is a diagram for describing a specific example of filtered values (steps S11 and S12 of FIG. 3) used in the clutch position control.

FIG. 4 is a diagram for describing a specific example of the filtered values (steps S11 and S12 of FIG. 3). With respect to the engine rotational speed Ne determined based on the output signal of the crank sensor 28, the filtered value Ne_ave is small in amplitude and there is a time lag in the change thereof.

The weakly filtered value Ne_ave (α1) obtained with the smoothing factor α of small value α1 (weak smoothing factor) is comparatively large in amplitude and is small in time lag with respect to the engine rotational speed Ne. In an ordinary driving state, a satisfactory riding feeling that is in accordance with accelerator operation is obtained by performing the clutch position control using the weakly filtered value Ne_ave (α1) to eliminate influence of noise, etc.

On the other hand, the strongly filtered value Ne_ave (α2) obtained with the smoothing factor α of large value α2 (strong smoothing factor) is comparatively small in amplitude and is comparatively large in time lag with respect to the engine rotational speed Ne. In a driving state where hunting is occurring in the engine rotational speed due to the injection cutting control, hunting of the clutch position (clutch pressing amount) that accompanies the hunting of the engine rotational speed can be avoided by performing the clutch position control using the strongly filtered value Ne_ave (α2). Start control can thereby be performed while avoiding influence of engine rotational speed hunting.

Figure 5:
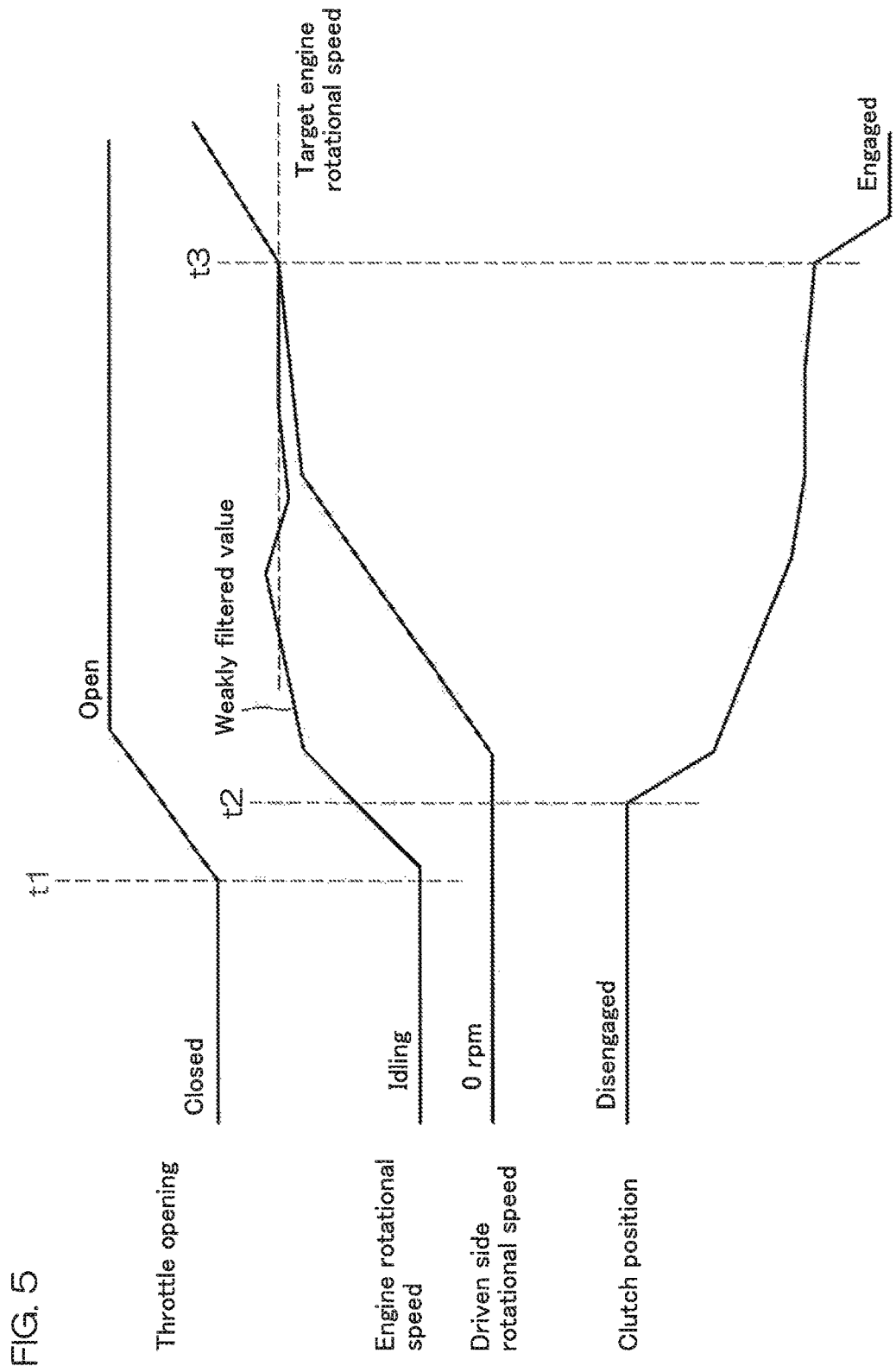
FIG. 5 is a time chart for describing an ordinary start control.

FIG. 5 is a time chart for describing an ordinary start control and illustrates an operation example where the injection cutting control is not performed. When the accelerator operator 20 is operated and the throttle is opened (time t1), the engine rotational speed increases from the idling rotational speed. When the engine rotational speed becomes not less than a certain value (time t2), the control unit 10 sets a target engine rotational speed that is in accordance with the throttle opening to start the start control. Specifically, the control unit 10 controls the clutch position, that is, the clutch pressing amount so that the engine rotational speed (or more accurately, the weakly filtered value) approaches the target engine rotational speed. The clutch 3 is thereby put in the engaged state (time t3) via the half-clutch state from the disengaged state. The rotational speed of the driven side portion 32 (driven side rotational speed) of the clutch 3 thus increases monotonously and enters a state of being equal to the engine rotational speed equivalent value (driving side rotational speed).

Figure 6:
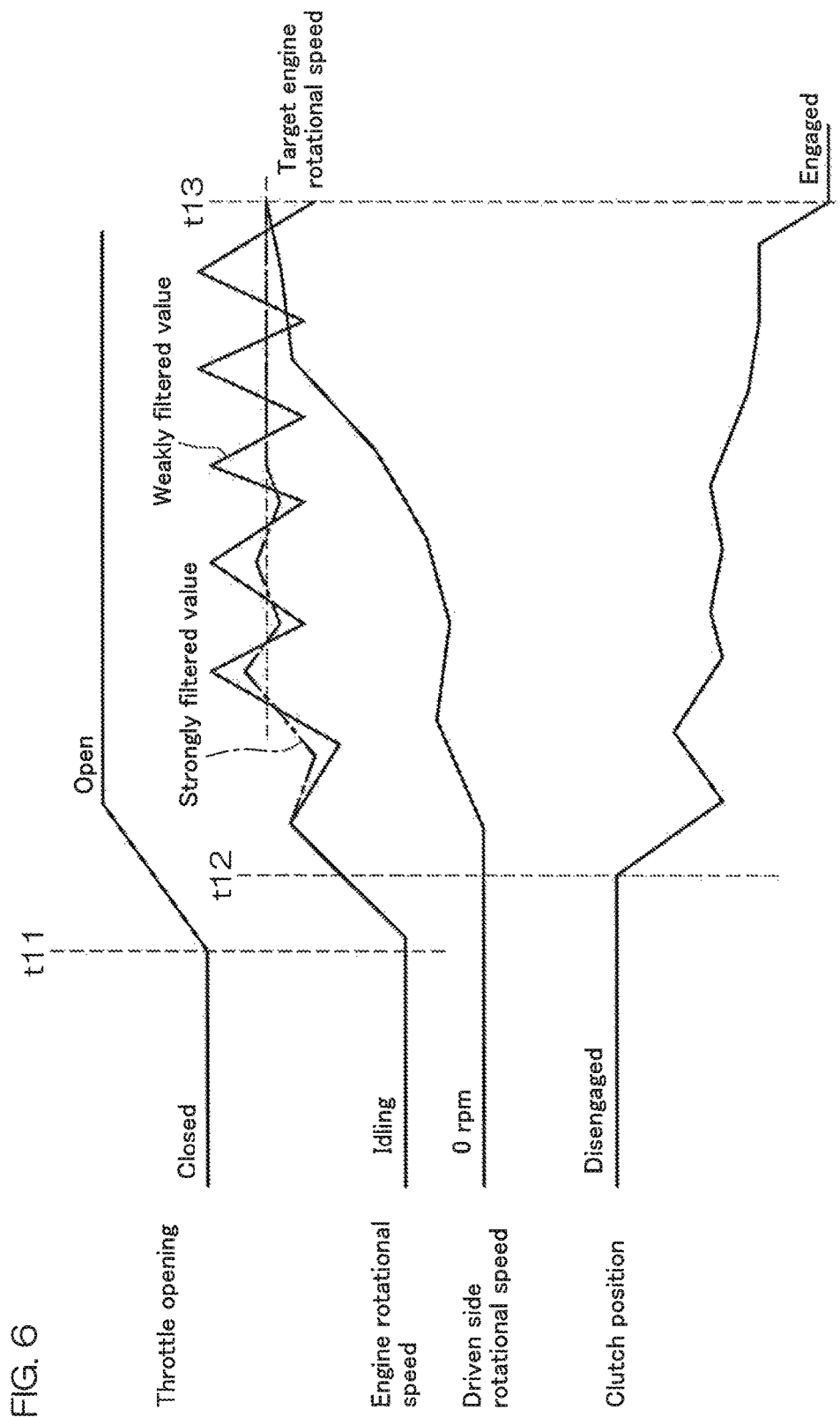
FIG. 6 is a time chart illustrating an operation example in a case where the injection cutting control is executed during the start control.

FIG. 6 illustrates an operation example in a case where the injection cutting control is executed during the start control. When the accelerator operator 20 is operated and the throttle is opened (time t11), the engine rotational speed increases from the idling rotational speed. When the engine rotational speed becomes not less than a certain value (time t12), the control unit 10 sets the target engine rotational speed that is in accordance with the throttle opening to start the start control. On the other hand, when the fuel injection by the fuel injector 22 is cut periodically by the injection cutting control, the engine rotational speed (or more accurately, the weakly filtered value) is put in a hunting state of repeating rapid decrease due to the injection cutting and rapid increase due to the fuel injection. In contrast, the strongly filtered value, obtained by performing the strong filtering process on the engine rotational speed, exhibits a slow change with time.

The control unit 10 thus controls the clutch position, that is, the clutch pressing amount so that the strongly filtered value approaches the target engine rotational speed. Occurrence of hunting in the clutch pressing amount can thereby be avoided and therefore the clutch 3 is put in the engaged state (time t13) via the half-clutch state from the disengaged state. The rotational speed of the driven side portion 32 (driven side rotational speed) of the clutch 3 thus increases and enters a state of being equal to the engine rotational speed equivalent value (driving side rotational speed). The clutch 3 can thus be put in the engaged state to enable the vehicle 1 to be started even during the injection cutting control.

The second clutch position control using the strongly filtered value may be ended when the clutch 3 reaches the engaged state. Also, if the clutch 3 is in the engaged state, there is no need to switch to the second clutch position control using the strongly filtered value even if the rotational speed suppression control is performed.

Figure 7:
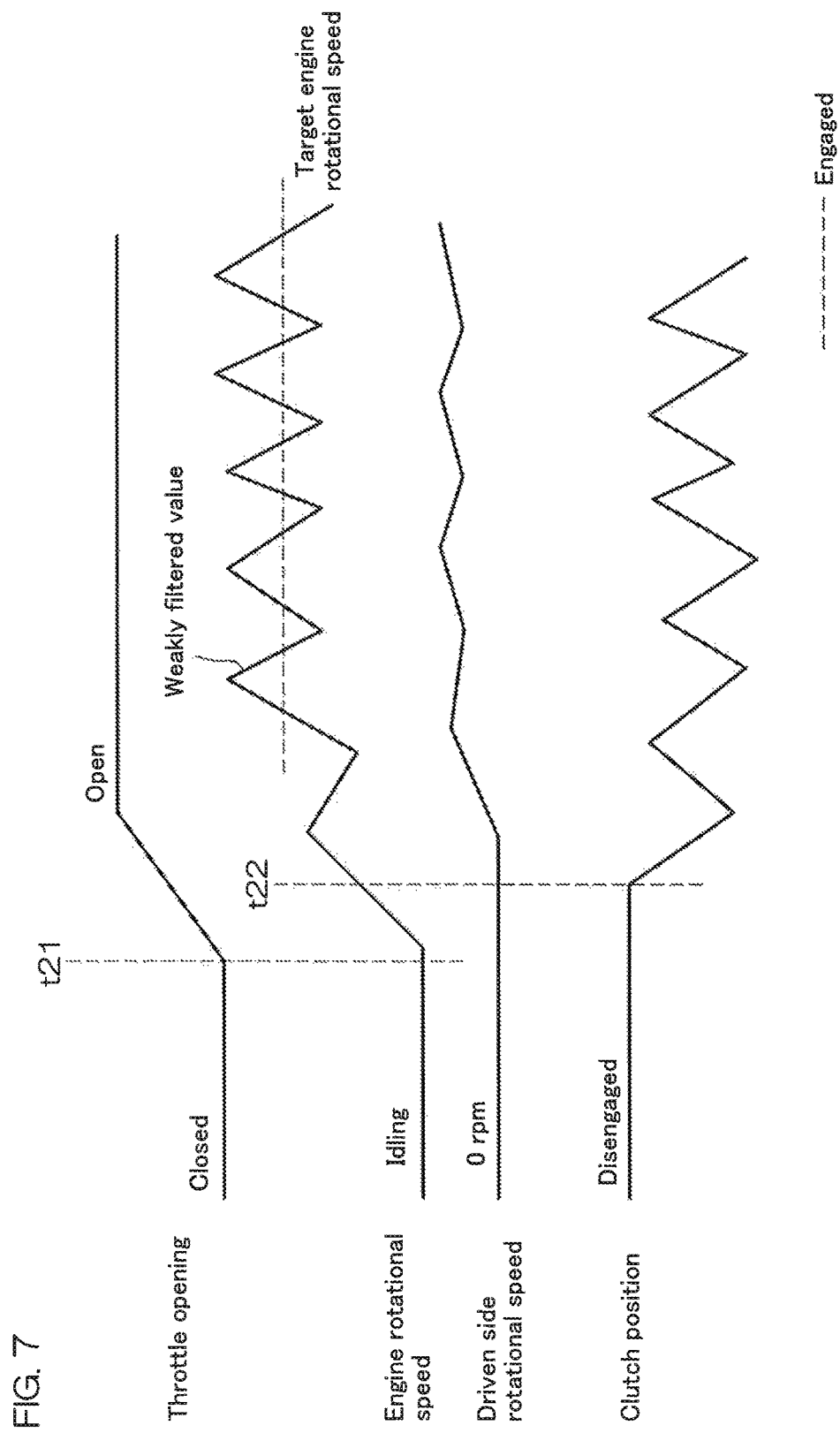
FIG. 7 is a time chart for describing operation by the arrangement of a comparative example.

FIG. 7 is a time chart for describing operation by the arrangement of a comparative example and illustrating an operation example where clutch position control using the weakly filtered value is performed when the injection cutting control is executed during the start control.

When the accelerator operator 20 is operated and the throttle is opened (time t21), the engine rotational speed increases from the idling rotational speed. When the engine rotational speed becomes not less than a certain value (time t22), the control unit 10 sets the target engine rotational speed that is in accordance with the throttle opening to start the start control. That is, the control unit 10 controls the clutch position, that is, the clutch pressing amount so that the engine rotational speed (or more accurately, the weakly filtered value) approaches the target engine rotational speed equivalent value.

On the other hand, when the fuel injection by the fuel injector 22 is cut periodically by the injection cutting control, the engine rotational speed (or more accurately, the weakly filtered value) is put in a hunting state of repeating rapid decrease due to the injection cutting and rapid increase due to the fuel injection. More specifically, the weakly filtered value varies periodically between a value exceeding the target engine rotational speed and a value lower than the target engine rotational speed.

When control of the clutch position is executed using such a weakly filtered value, hunting also occurs in the clutch position, that is, the clutch pressing amount and the clutch pressing amount increases and decreases repeatedly. More specifically, when the weakly filtered value decreases rapidly, the control unit 10 judges that the clutch pressing amount is too great and decreases the clutch pressing amount. Oppositely, when the weakly filtered value increases rapidly, the control unit 10 judges that the clutch pressing amount is too small and increases the clutch pressing amount. By the repetition of the above, the clutch pressing amount undergoes hunting.

Therefore, even if the clutch 3 enters the half-clutch state, it cannot leave the half-clutch state and enter the engaged state. Consequently, the half-clutch state is kept for a long time and the rotational speed of the driven side portion 32 (driven side rotational speed) of the clutch 3 cannot be increased to the engine rotational speed equivalent value.

Due to the above, the vehicle 1 cannot be started. Moreover, a large load may be applied to the clutch 3 and the engine 2 due to the behavior of the clutch 3 being unstable.

Figure 8:
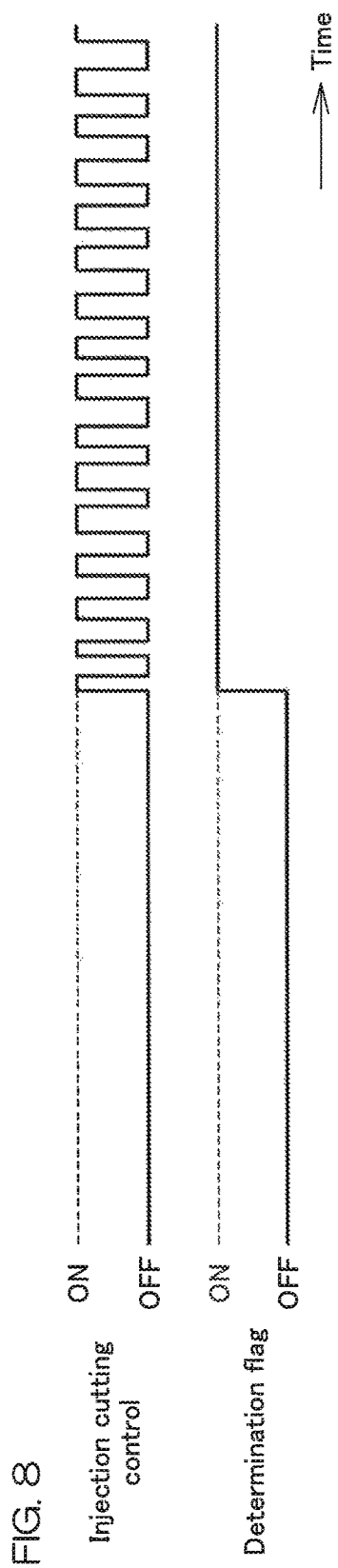
FIG. 8 is a time chart for describing a relationship of the injection cutting control and a determination flag.

FIG. 8 is a time chart for describing a relationship of the injection cutting control and the determination flag. The injection cutting control is turned on and off at a short cycle and hunting occurs in the engine rotational speed accordingly. On the other hand, when the predetermined type of engine rotational speed suppression condition is met (step 3 of FIG. 2: YES), the determination flag is set to the on state (step S4 of FIG. 2).

However, even if the injection cutting control is turned off, the determination flag is not inverted immediately but is reset to the off state (step S8 of FIG. 2) after waiting for the elapse of the predetermined time (step S7 of FIG. 2). The predetermined time is set sufficiently long in comparison to the on/off cycle of the injection cutting control, or more specifically, the control cycle. The strongly filtered value is thereby used continuously at least throughout the predetermined time (steps S13 and S15 of FIG. 3). Hunting of the clutch position (clutch pressing amount) can thereby be avoided reliably.

Figure 9:
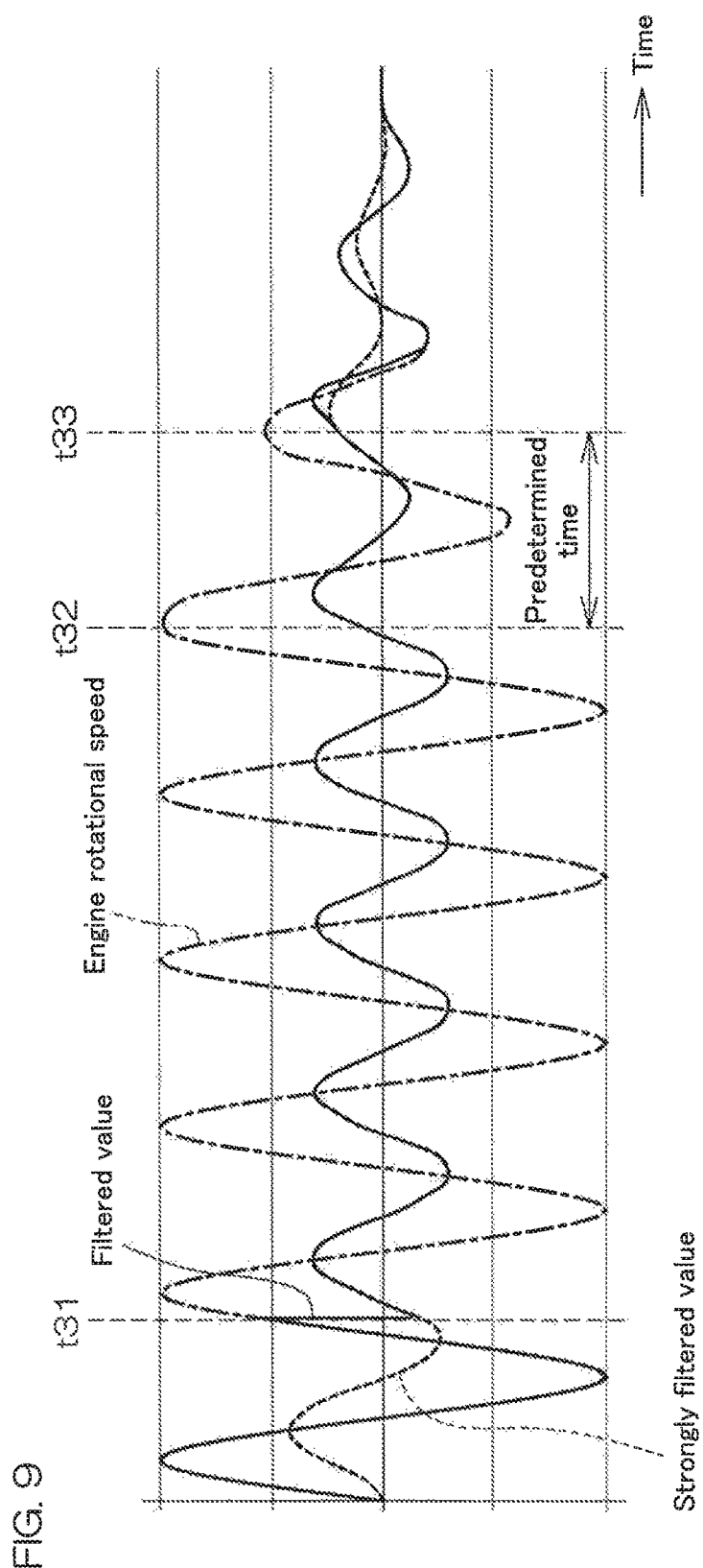
FIG. 9 is a diagram for describing an example of change of the filtered value used for the clutch position control.

FIG. 9 is a diagram for describing an example of change of the filtered value (weakly filtered value or strongly filtered value) used for the clutch position control. The weakly filtered value and the strongly filtered value are calculated constantly. Before the determination flag is set to on at a time t31, the weakly filtered value that exhibits a change substantially equal to the engine rotational speed is used. When the determination flag is set to on at the time t31, the weakly filtered value is switched to the strongly filtered value instantaneously. Thereafter, the strongly filtered value, which is small in amplitude and has a time lag with respect to the change of the engine rotational speed, is used.

At a time t32, the engine rotational speed suppression condition is no longer met and when this state is sustained for the predetermined time (step S7 of FIG. 2), the determination flag is set to off at a time t33 (step S8 of FIG. 2) and the filtered value used in the clutch position control is switched to the weakly filtered value (steps S13 and S14 of FIG. 3). Also, in accordance with the injection cutting control no longer being performed, the amplitude of the engine rotational speed decreases in a period from the time t32.

A discontinuity in the filtered value used does not occur when switching from the strongly filtered value to the weakly filtered value because the strongly filtered value is substituted into the weakly filtered value (step S16 of FIG. 3) during the period in which the strongly filtered value is used. Also, the filtered value is converged smoothly to a state of exhibiting a change substantially equal to the engine rotational speed by the weak smoothing factor α1 being decreased from the strong smoothing factor α2 to the default value by the minute constant δ at a time (steps S17, S18, and S19 of FIG. 3).

As described above, with the present preferred embodiment, when a predetermined engine rotational speed suppression condition is met, the control unit 10 executes the rotational speed suppression control of suppressing the engine rotational speed of the engine 2. When an engine rotational speed suppression condition of the specific type (example of the hunting condition) is met, the control unit 10 sets the determination flag to on and executes the second clutch position control using the strongly filtered value. If an engine rotational speed suppression condition of the specific type is not met, the control unit 10 executes the first clutch position control using the weakly filtered value.

The strongly filtered value is low in the property of following the engine rotational speed in comparison to the weakly filtered value. The second clutch position control is thus low in response to the engine rotational speed and the first clutch position control is high in response to the engine rotational speed. Therefore, the response of the clutch position control with respect to the engine rotational speed is low when the rotational speed suppression control is performed with an engine rotational speed suppression condition of the specific type being met. Therefore even if hunting of the engine rotational speed occurs, there is little influence on the clutch position control. Unstable clutch behavior can thus be avoided and adverse influence on the engine 2 and the clutch 3 can be suppressed.

Especially if the clutch actuator 11 is an electric actuator, an overcurrent due to hunting of the clutch position can be avoided. The load on the clutch actuator 11 can thereby be prevented from becoming excessive and degradation of the clutch actuator 11 can thus be suppressed. Also, improvement of starting property and improvement of the feeling when shifting to low speed is performed are made possible because the hunting of the clutch position can be suppressed.

On the other hand, if the rotational speed suppression control based on the specific type of engine rotational speed suppression condition is not executed and there is no possibility of engine rotational speed hunting influencing the start control, the first clutch position control of high response is performed. That is, execution of the second clutch position control that is made low in response to the engine rotational speed can be limited to when it is required.

For example, in a case of travelling on a steeply sloping road, as in off-road travelling, it may be desired, during low-speed travel, that is, while the engine rotational speed is low, to step on the accelerator to rapidly increase the engine rotational speed. In such a case, unless an engine rotational speed suppression condition of the specific type is met, the clutch position control has sufficient response to the engine rotational speed. The operation of the clutch 3 thus follows the accelerator operation performed by the driver and a satisfactory riding feeling can be obtained.

With the present preferred embodiment, the rotational speed suppression control is executed by the fuel supply cutting control of cutting the supply of fuel to the engine 2, or more specifically, the injection cutting control of cutting the fuel injection by the fuel injector 22. Engine rotational speed hunting occurs readily when the injection cutting control is performed. Despite this, the second clutch position control can prevent the engine rotational speed hunting from having a large influence on the clutch position control and therefore the clutch behavior can be stabilized and adverse influence on the engine 2 and the clutch 3 can be avoided.

Also with the present preferred embodiment, when the determination flag is set to the on state, the on state is maintained for the predetermined time and the determination flag is reset to the off state thereafter. Therefore, whereas the second clutch position control is started when the rotational speed suppression control is started upon meeting of the engine rotational speed suppression condition of the specific type, the second clutch position control is continued until the elapse of the predetermined time from the ending of the rotational speed suppression control. The rotational speed suppression control, such as the fuel supply cutting control, may be switched between being enabled and disabled at a short cycle. If the second clutch position control is switched between being enabled and disabled accordingly, engine rotational speed hunting may have an influence after all. Therefore by, continuing the second clutch position control for the predetermined time even when the rotational speed suppression control ends, the influence of engine rotational speed hunting can be suppressed more reliably.

Also with the present preferred embodiment, the second clutch position control can be started and ended appropriately by using the determination flag. Intervention of the second clutch position control can be limited to when it is required.

Also with the present preferred embodiment, when the determination flag switches from being on to off, the smoothing factor α1 is decreased gradually from the strong smoothing factor α2 to the weak smoothing factor α1 (default value). The second clutch position control thereby ends while gradually weakening the filtering and gradually transitions to the first clutch position control. Transition from the second clutch position control to the first clutch position control can thereby be performed in a continuous manner without gaps. Adverse influence on the clutch 3 and the engine 2 can thus be avoided, and additionally, the riding feeling during clutch engagement is satisfactory.

Also with the present preferred embodiment, while switching between actuation (locked state) and non-actuation (released state) of the differential lock is in progress, the determination flag is set to on and the second clutch position control, which is lowered in response to the engine rotational speed, is executed. Influence of engine rotational speed hunting on the clutch 3 and engine 2 can thereby be suppressed when the vehicle 1 is made to move at a low speed for switching of the differential lock.

Also with the present preferred embodiment, the second clutch position control is executed when the engine rotational speed is suppressed for the purpose of protecting the engine 2 when the oil pressure of the engine 2 is low and when the cooling water temperature of the engine 2 is low. Adverse influence on the clutch 3 and the engine 2 due to engine rotational speed hunting can thereby be suppressed.

Also with the present preferred embodiment, the second clutch position control is executed when an engine rotational speed suppression condition of the specific type among the plurality of engine rotational speed suppression conditions is met, and the first clutch position control is executed when only an engine rotational speed suppression condition besides that of the specific type is met. Appropriate clutch position control can thereby be performed in accordance with the engine rotational speed suppression condition that is met. A more appropriate clutch position control is thereby made possible, and the vehicle 1 can be provided with which satisfactory actuation characteristics can be realized at the same time as protecting the clutch 3 and the engine 2.

More specifically, in circumstances where the maximum vehicle speed restriction condition (engine rotational speed suppression condition 1) and the diff lock vehicle speed restriction condition (engine rotational speed suppression condition 2) are met, the engine rotational speed is sufficiently high and therefore start control is not performed and engagement and disengagement of the clutch 3 are merely performed mainly for shifting. Moreover, even if variation occurs in the engine rotational speed due to the injection cutting control at high-speed rotation, the variation is short in cycle and does not have a large influence on the position control of the clutch 3. Therefore, even if the engine rotational speed suppression conditions 1 and 2 are met, there is no benefit to executing the second clutch position control if the engine rotational speed suppression conditions 3 to 5 are not met.

Figure 10:
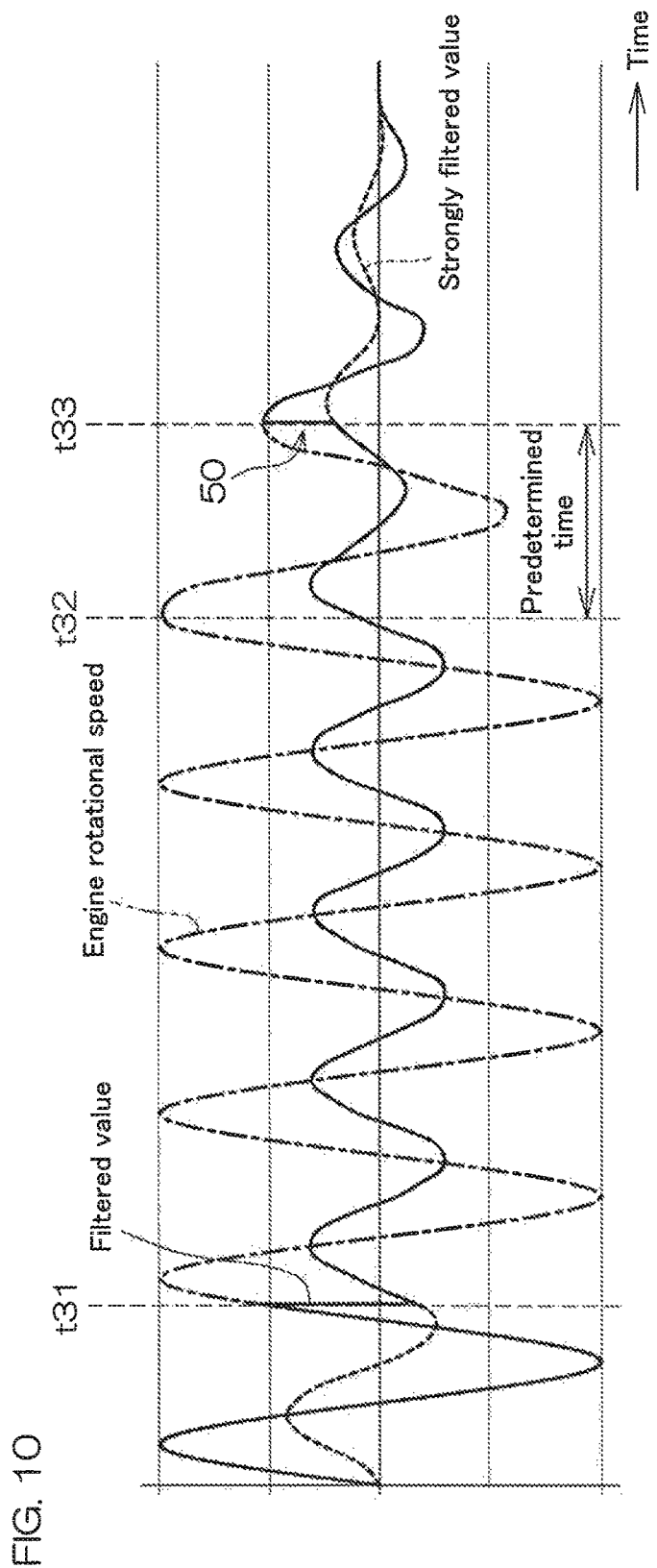
FIG. 10 is a time chart for describing an operation example of a modification example.

FIG. 10 is a diagram for describing of a modification example of the present preferred embodiment and illustrates an operation example where the processes of steps S16 to S19 of FIG. 3 are omitted. The same reference symbols as those in FIG. 9 are provided for the sake of comparison. The operation up to the time t33 is the same as in FIG. 9.

At the time t33, the filtered value used in the clutch position control is switched to the weakly filtered value. The strongly filtered value and the weakly filtered value are calculated independently of each other and therefore a discontinuity arises in the used filtered value as indicated by reference symbol 50 when switching from the strongly filtered value to the weakly filtered value. If such a discontinuity arises in the middle of start control, a discontinuity may arise in the control of the clutch position. However, a discontinuity of a level that will not influence the riding feeling greatly is allowable and therefore the operation shown in FIG. 10 is also included in the preferred embodiment of the present invention.

Figure 11:
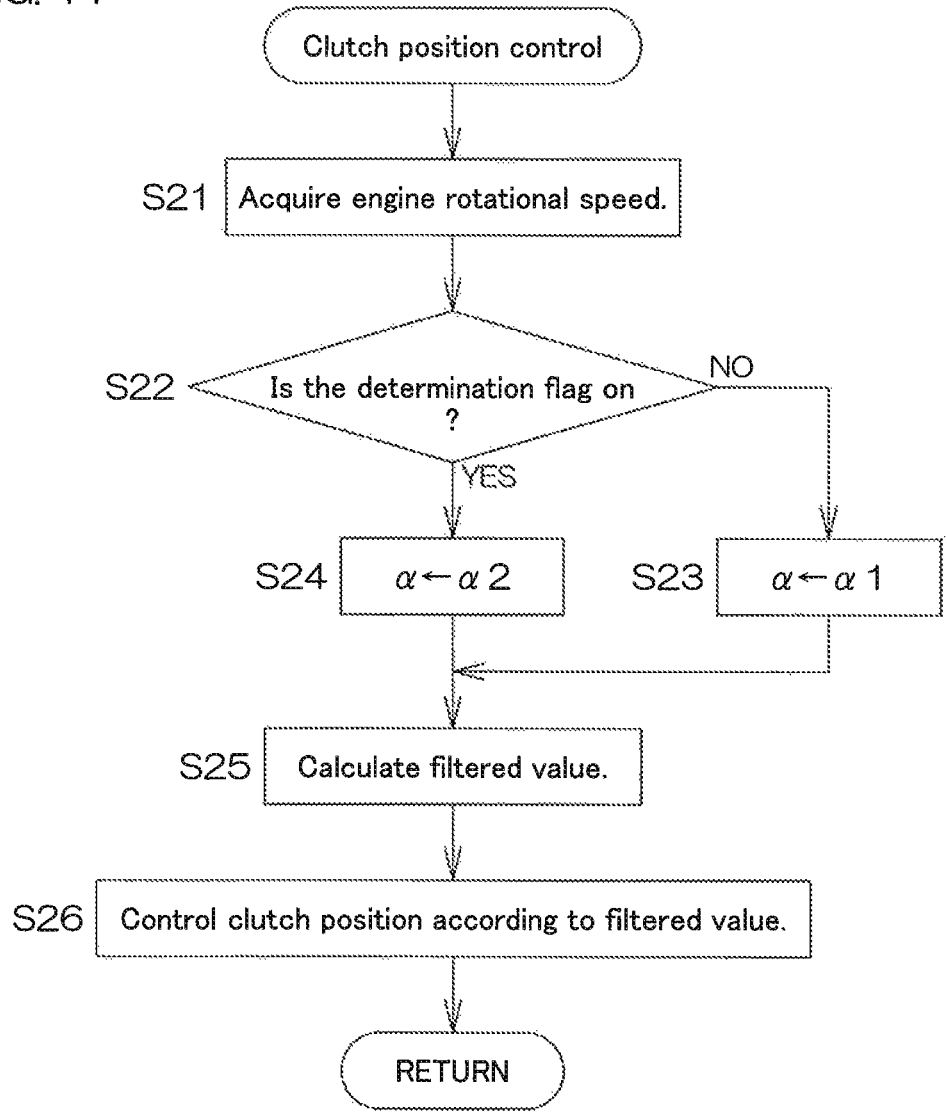
FIG. 11 is a flowchart for describing a clutch position control of another modification example.

FIG. 11 is a diagram for describing another modification example and illustrates an example of clutch position control that is repeated by the control unit 10 at a control cycle. The control unit 10 determines the engine rotational speed using the output signal of the crank sensor 28 (step S21). Further, if the determination flag is in the off state (step S22: NO), the control unit 10 substitutes the weak smoothing factor α1, a smaller value, for the smoothing factor α (step S23). Also, if the determination flag is in the on state (step S22: YES), the control unit 10 substitutes the strong smoothing factor α2, a larger value, for the smoothing factor α (step S24). Using the smoothing factor α thus determined, the control unit 10 determines the filtered value by calculation in accordance with the formula (1) (step S25). Based on the filtered value, the control unit 10 controls the clutch position (clutch pressing amount) (step S26).

FIG. 12 is a time chart for describing an operation example by the clutch position control of FIG. 11. The same reference symbols as those in FIG. 10 are provided for the sake of comparison. Before the determination flag is set to on at the time t31, the weak smoothing factor α1 is used and therefore the filtered value exhibits a change substantially equal to the engine rotational speed. When the determination flag is set to on at the time t31, the smoothing factor α is switched to the strong smoothing factor α2. The filtered value thus changes gradually to a value of small amplitude in the period from the time t31. If a state where an engine rotational speed suppression condition of the specific type is not met is sustained for the predetermined time in the period from the time t32 (step S7 of FIG. 2), the smoothing factor α is switched from the strong smoothing factor α2 to the weak smoothing factor α1 at the time t33. The effect of switching the smoothing factor α to the small value appears instantly and, as indicated by reference symbol 60, the filtered value exhibits a change that instantly follows the engine rotational speed. Such an operation is also included in the preferred embodiment of the present invention.

Figure 13A:
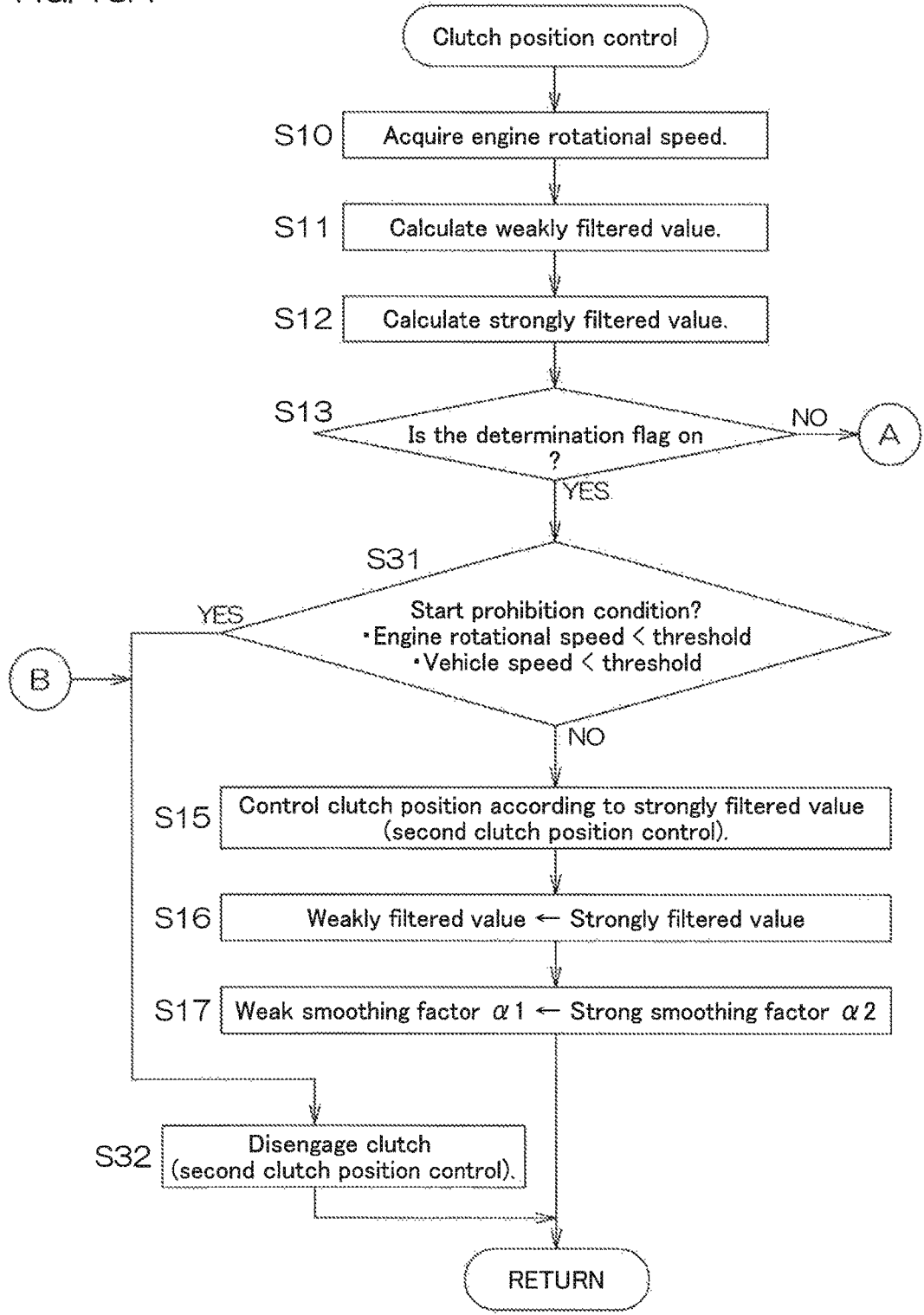

FIG. 13A and FIG. 13B are flowcharts for describing a clutch position control according to a second preferred embodiment of the present invention. In the description of the present preferred embodiment, FIG. 1 and FIG. 2 described above shall be referenced again. Also in FIG. 13A and FIG. 13B, steps corresponding to the steps shown in FIG. 3 are indicated by the same reference symbols.

In the present preferred embodiment, when the determination flag is in the on state (step S13: YES), the control unit 10 judges whether or not a start prohibition condition is met (step S31). The start prohibition condition may include at least one of the following conditions 1 and 2. That is, the start prohibition condition is met when at least one of either of conditions 1 and 2 is met. Condition 1: The engine rotational speed is less than a predetermined start prohibition threshold.

Condition 2: The vehicle speed is less than a predetermined start prohibition vehicle speed threshold.

If the start prohibition condition is met (step S31: YES), the control unit 10 controls the clutch 3 to be in the disengaged state (step S32; clutch disengage control). The driving force of the engine 2 is thereby prevented from being transmitted to the vehicle wheels 5 and therefore the starting of the vehicle 1 is prohibited. That the determination flag is on and the start prohibition condition is met thus make up a clutch engagement prohibition condition that prohibits the engagement of the clutch 3. The clutch disengage control (step S32) is a control by which the position of the clutch 3 becomes unresponsive to the engine rotational speed and is an example of the second clutch position control that is lower in response than the first clutch position control.

On the other hand, if the determination flag is in the off state (step S13: NO), the control unit 10 judges whether or not the clutch 3 is in the disengaged state (step S33). If the clutch 3 is in the disengaged state (step S33: YES), the control unit 10 further judges whether or not a clutch disengage control ending condition is met (steps S34 and S35). Specifically, if the throttle opening is fully closed (step S34) and the engine rotational speed is not more than a predetermined value (for example, 2000 rpm) (step S35), the clutch disengage control ending condition is met. Either judgment may be made before the other.

If the clutch disengage control ending condition is met, the control unit 10 uses the weakly filtered value to perform clutch position control, that is, clutch engage control (step S14). Therefore, when the clutch disengage control (step S32) is performed and starting is prohibited, the start control for engaging the clutch 3 is allowed after returning the accelerator operator 20 to the fully closed position and lowering the engine rotational speed. If the clutch disengage control ending condition is not met (NO in either step S34 or S35), the clutch disengage control (step S32) is continued.

If when the determination flag is in the off state (step S13: NO), the clutch 3 is in the engaged state (step S33: NO), the processes of steps S34 and S35 are omitted and the start control (clutch engage control) is continued (steps S14, S18, and S19).

As described above, with the present preferred embodiment, when the start prohibition condition (clutch engagement prohibition condition) is met with the determination flag being in the on state, the clutch 3 is controlled to be in the disengaged state without dependence on the engine rotational speed. Starting of the vehicle 1 is thus prohibited. Unstable clutch behavior due to engine rotational speed hunting can thereby be avoided and adverse influence on the engine 2 and the clutch 3 can thus be avoided.

Also with the present preferred embodiment, if the start prohibition condition (clutch engagement prohibition condition) is not met, the second clutch position control (clutch engage control) using the strongly filtered value is executed. Therefore, the clutch disengage control or the clutch engage control using the strongly filtered value is performed according to whether or not the start prohibition condition is met when the rotational speed suppression control is being performed. Appropriate clutch position control that is in accordance with the circumstances of engine rotational speed hunting can thereby be performed and the driving force of the engine 2 can thus be transmitted to the vehicle wheels 5 appropriately while suppressing loads on the engine 2 and the clutch 3.

More specifically, with the present preferred embodiment, the start prohibition condition includes that the engine rotational speed is less than the predetermined threshold. Engagement of the clutch 3 is thereby prohibited when the engine rotational speed is less than the predetermined threshold and therefore the clutch 3 can be controlled to be in the disengaged state when the engine 2 is rotating at low speed and engine rotational speed hunting is occurring. When the clutch position control is performed using the strongly filtered value when the engine rotational speed is low, engine stall may occur. Thus in the present embodiment, when the engine rotational speed is low, the clutch 3 is controlled to be in the disengaged state to avoid engine stall and avoid application of excessive loads on the engine 2 and the clutch 3.

Especially with the present preferred embodiment, the determination flag is set to the on state when an engine rotational speed suppression condition of the specific type among the plurality of types of engine rotational speed suppression conditions is met. When the determination flag is in the on state, whether or not the start prohibition condition is met is determined. Control of the clutch 3 to the disengaged state can thus be limited to the case where the rotational speed suppression control that requires clutch disengagement is performed.

Also with the present preferred embodiment, if during execution of the clutch disengage control, the throttle opening becomes fully closed and the engine rotational speed becomes less than the predetermined value, the clutch disengage control is ended. Therefore, when the throttle opening is not fully closed or the engine rotational speed is not less than the predetermined value, the clutch 3 is maintained in the disengaged state. Inadvertent engagement of the clutch 3 under circumstances where the engine 2 may generate a large driving force can thus be avoided. That is, engagement of the clutch 3 is allowed when the output of the engine 2 becomes low and therefore the vehicle 1 will not be started by a large driving force being transmitted inadvertently to the vehicle wheels 5.

Besides such features, the present preferred embodiment is the same as the first preferred embodiment, and the same modifications as those in the case of the first preferred embodiment are also possible in regard to the calculation of the filtered values.

Figure 14:
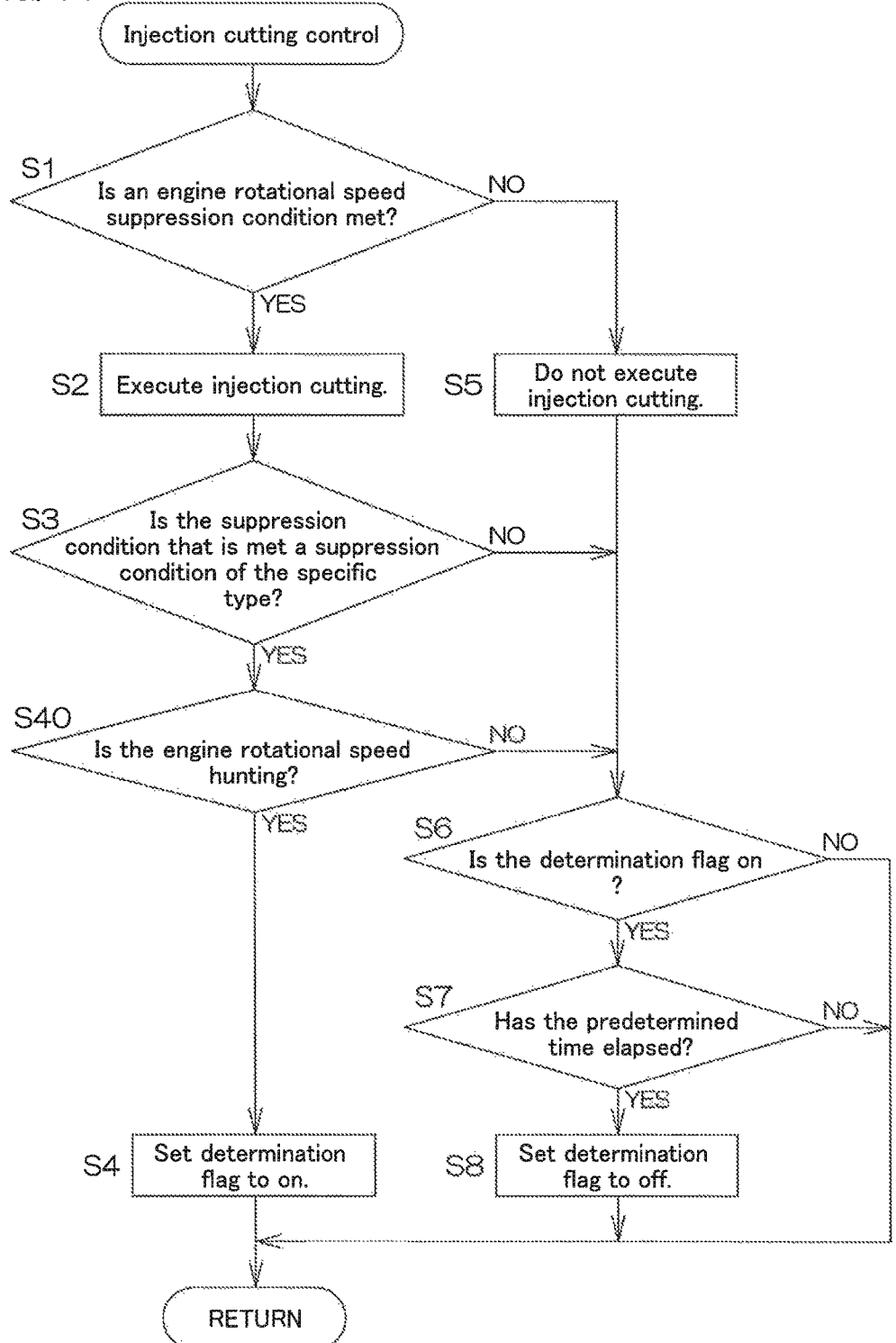
FIG. 14 is a flowchart for describing an injection cutting control in a third preferred embodiment of the present invention.

FIG. 14 is a flowchart for describing a third preferred embodiment of the present invention and illustrates an injection cutting control. In the description of the present preferred embodiment, FIG. 1 described above shall be referenced again. Also in FIG. 14, steps corresponding to the steps shown in FIG. 2 are indicated by the same reference symbols.

In the present preferred embodiment, when an engine rotational speed suppression condition of the specific type is met (step S3), the control unit 10 further judges whether or not hunting is actually occurring in the engine rotational speed (step S40). If hunting is actually occurring in the engine rotational speed (step S40: YES), the determination flag is set to on (step S4). If hunting is not actually occurring in the engine rotational speed (step S40: NO), the processes from step S6 are executed.

Figure 15:
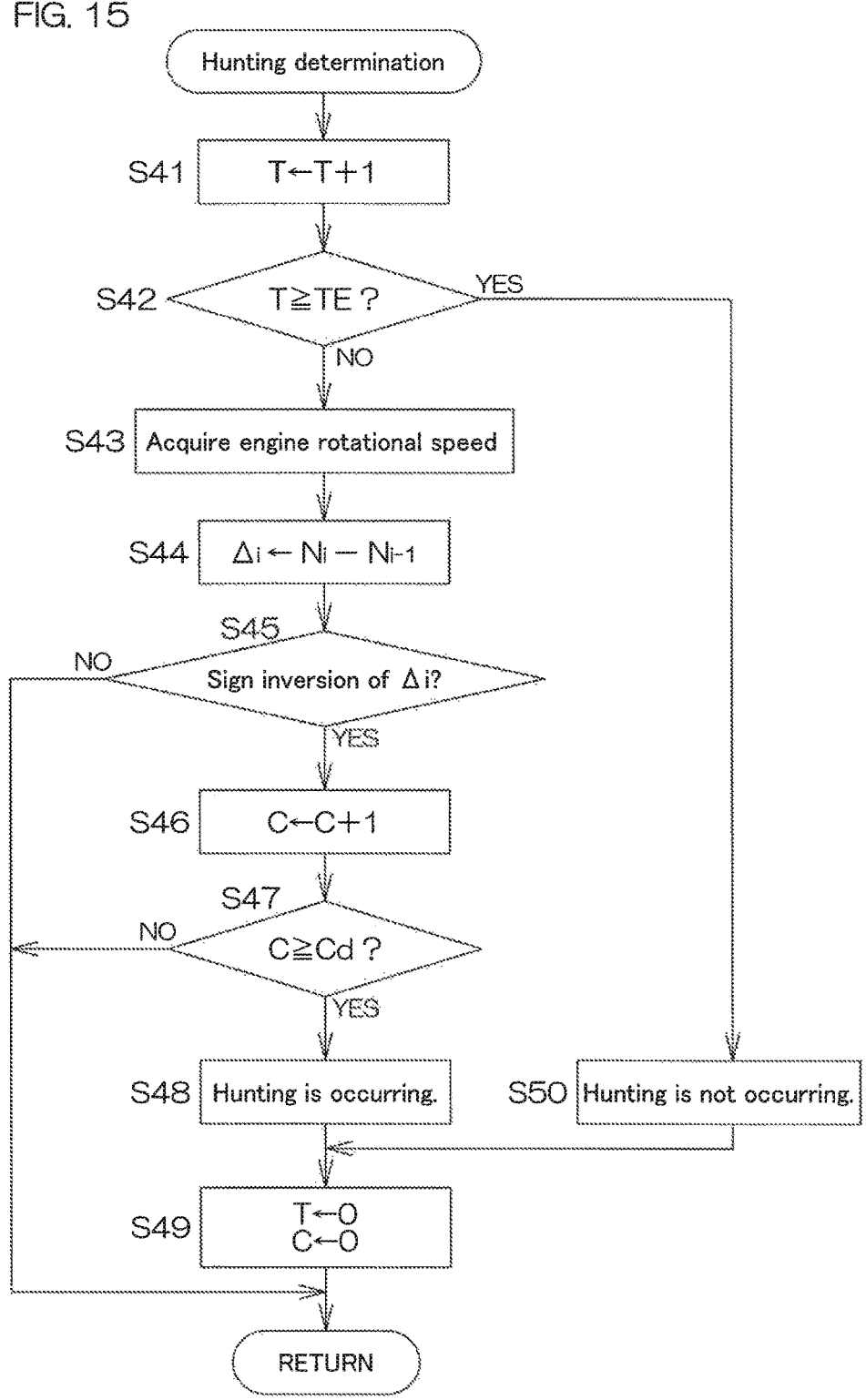
FIG. 15 is a flowchart for describing a specific example of a process of determining whether or not hunting is actually occurring in an engine rotational speed (step S40 of FIG. 14).

FIG. 15 is a flowchart for describing a specific example of a process of determining whether or not hunting is actually occurring in the engine rotational speed (step S40 of FIG. 14).

The control unit 10 increments a variable T (with an initial value of zero), for measurement of time, by "+1" (step S41) and judges whether or not the variable T has reached a time measurement ending value TE (step S42). If a negative judgment is made, the control unit 10 determines the engine rotational speed based on the output signal from the crank sensor 28 (step S43). The time measurement ending value TE is set, for example, to a value equivalent to approximately 500 milliseconds.

Further, the control unit 10 subtracts the engine rotational speed $N_{i-1}$ of the previous control cycle from the engine rotational speed $N_i$ of the current control cycle to determine an engine rotational acceleration $\Delta_i$ (step s44). The control unit 10 then compares the sign of the engine rotational acceleration $\Delta_i$ of the current control cycle with the sign of the engine rotational acceleration $\Delta_{i-1}$ of the previous control cycle and judges whether or not sign inversion has occurred (step S45).

If sign inversion has not occurred (step S45: NO), the process of the current control cycle is ended and a return is performed. If sign inversion has occurred (step S45: YES), the control unit 10 increments a variable C (with an initial value of zero), for counting the number of times of sign inversion of the engine rotational acceleration, by "+1" (step S46). The control unit 10 then judges whether or not the variable C has reached a predetermined determination value Cd (for example, Cd=4 to 6) (step S47).

If the variable C has not reached the determination value Cd (step S47: NO), the process of the current control cycle is ended and a return is performed. If the variable C has reached the determination value Cd (step 47: YES), the control unit 10 determines that hunting is actually occurring in the engine rotational speed (step S48), resets the variables T and C to zero, respectively (step S49), and ends the process of the current control cycle.

If in step S42, the variable T has reached the time measurement ending value TE (step S42: YES), the control unit 10 determines that hunting is not occurring in the engine rotational speed (step S50), resets the variables T and C to zero, respectively (step S49), and ends the process of the current control cycle.

Thus with the present preferred embodiment, the control unit 10 determines whether or not hunting is actually occurring in the engine rotational speed (example of the hunting condition). If an engine rotational speed suppression condition of the specific type is met and hunting is actually occurring in the engine rotational speed, the control unit 10 sets the determination flag to the on state and executes the second clutch position control of low response or else executes the first clutch position control of high response. Excessive loads on the engine 2 and the clutch 3 due to engine rotational speed hunting can thereby be avoided. Moreover, execution of the second clutch position control of low response can be limited to only when it is required and therefore the vehicle 1 that is excellent in operation characteristics can be provided while realizing protection of the engine 2 and the clutch 3.

Also with the present preferred embodiment, the control unit 10 determines that hunting is actually occurring in the engine rotational speed when the engine rotational speed increases and decreases (the sign of the rotational acceleration becomes inverted) within the predetermined time equivalent to the time measurement ending value TE. More specifically, the control unit 10 determines that hunting is actually occurring in the engine rotational speed when increase and decrease of the engine rotational speed occur for not less than the predetermined number of times Cd within the predetermined time equivalent to the time measurement ending value TE. Engine rotational speed hunting can thereby be judged appropriately and therefore the vehicle 1 that is excellent in operation characteristics can be provided while realizing protection of the engine 2 and the clutch 3.

Besides such features, the present preferred embodiment is the same as the first preferred embodiment, and the same modifications as those in the case of the first preferred embodiment are also possible in regard to the calculation of the filtered values.

Although preferred embodiments of the present invention have been described, the present invention may be implemented in yet other modes as listed for example below.

(1) Although with each of the preferred embodiments described above, the engine rotational speed is used as engine rotation information, other engine rotation information may be used instead. For example, an engine rotational speed differential value (engine rotational acceleration) may be used as the engine rotation information. The engine rotational speed differential value may be determined by a formula (2) shown below. In this case, a moving average value Dne_ave(n), obtained by a formula (3) shown below may be used as the filtered value for the clutch position control. The moving average value Dne_ave(n) is a value calculated using the engine rotational speed differential values at different time points within a period from the start of operation of the engine 2 to the current time.

$$Dne(n)=Ne(n)-Ne(n-1) \quad (2)$$

Dne(n): Engine rotational speed differential value of the current control cycle
Ne(n): Engine rotational speed of the current control cycle
Ne(n−1): Engine rotational speed of the previous control cycle $$Dne\_ave(n)=Dne(n)-(Dne(n)-Dne\_ave(n-1))\times\beta \quad (3)$$

Dne_ave(n): Filtered value (smoothened engine rotational speed differential value) of the current control cycle
Dne_ave(n−1): Filtered value (smoothened engine rotational speed differential value) of the previous control cycle
β: smoothing factor. Here, 0<β<1.

The control unit 10 determines the weakly filtered value with the smoothing factor β=β1 (weak smoothing factor) (see step S11 of FIG. 3) and determines the strongly filtered value with the smoothing factor β=β2 (strong smoothing factor; (β2>β1) (see step S12 of FIG. 3). The control unit 10 uses the weakly filtered value in the first clutch position control (see step S15 of FIG. 3) and the strongly filtered value in the second clutch position control (see step S14 of FIG. 3).

Regardless of whether the moving average value of the engine rotational speed or the moving average value of the engine rotational speed differential value is used as the filtered value, the period for calculation of the moving average value is not restricted to the period from the start of operation of the engine 2 to the current time. For example, a fixed time preceding the current time may be used as the period for calculation of the moving average value.

(2) Specifically in the clutch position control using the engine rotational speed differential value, the control unit 10 may estimate a clutch torque based on the engine rotational speed differential value and control the clutch position based on the estimated clutch torque.

A relationship expressed by a formula (4) shown below holds among an engine torque Te transmitted to the driving side portion 31, the clutch torque Tc, and the engine rotational speed ω. Here, I is an inertial moment of the entirety of a portion of the power transmission path 6 that includes the driving side portion 31 of the clutch 3 and portions further upstream (to the engine 2 side) thereof and t is time.

$$Te-Tc=I\times(d\omega/dt) \quad (4)$$

Therefore, if Te>Tc, the engine rotational speed w increases. If Te<Tc, the engine rotational speed ω decreases. If Te=Tc, the engine rotational speed ω does not change.

It can be understood that by modifying the above formula (4), the clutch torque Tc can be obtained by a formula (5) shown below.

$$Tc=Te-I\times(d\omega/dt) \quad (5)$$

That is, the clutch torque Tc can be determined based on the engine torque Te and the engine rotational speed differential value dω/dt. Position control of the clutch 3 is performed so that the clutch torque Tc is adjusted to a target clutch torque.

(3) With each of the preferred embodiments, the second position control using the strongly filtered value and the second clutch position control (clutch disengage control) unresponsive to the engine rotational speed has been described. However, the second clutch position control may also include a control, which, while using the same engine rotation information as in the case of the first clutch position control (for example, the weakly filtered value), makes a displacement speed of the clutch with respect to the engine rotation information a lower speed than in the case of the first clutch position control. Specifically, the control unit 10 may, in the second clutch position control, perform a filtering process (smoothing process) on a command value for commanding the clutch actuator 11 and control the clutch actuator 11 based on the filtered command value.

(4) With each of the preferred embodiments, the meeting of an engine rotational speed suppression condition of the specific type is used as the condition for setting the determination flag to the on state. However, an arrangement may be made so that the determination flag is set to the on state if any engine rotational speed suppression condition is met regardless of the type of engine rotational speed suppression condition.

(5) With the second preferred embodiment, the start prohibition condition is determined when the determination flag is on, and if the start prohibition condition is not met, the start control is performed using the strongly filtered value. However, the determination of the start prohibition condition and the start control using the strongly filtered value may be omitted and an arrangement may be made so that when the determination flag is on, the clutch 3 is controlled to be in the disengaged state and the start control is not performed.

(6) With the third preferred embodiment, that an engine rotational speed suppression condition of the specific type is met and hunting is actually occurring in the engine rotational speed is used as the condition (hunting determination condition) for setting the determination flag to the on state. However, the determination related to the engine rotational speed suppression condition may be omitted and the determination flag may be set to the on state if hunting is actually occurring in the engine rotational speed.

(7) The contents of the clutch position control may be changed according to the type of the engine rotational speed suppression condition that is met. For example, the value of the strong smoothing factor α2 used to calculate the strongly filtered value may be changed according to the engine rotational speed suppression condition that is met. Also, either the clutch position control using the strongly filtered value or the clutch disengage control may be selected according to the engine rotational speed suppression condition that is met.

(8) With each of the preferred embodiments, an arrangement where a single control unit 10 controls the engine 2, the clutch 3, and the transmission 4 has been illustrated. This does not necessarily mean that the control unit 10 includes just a single computer. That is, the control unit 10 may include a plurality of computers. For example, the control unit 10 may include an engine control unit that controls the engine 2 and a shift control unit that controls the clutch 3 and the transmission 4.

(9) With each of the preferred embodiments, an example where a preferred embodiment of the present invention is applied to the vehicle 1 having the diff lock unit 8 has been illustrated. However, the present invention may also be applied to a vehicle not having a diff lock unit as well as to a vehicle not having a differential gear.

(10) With each of the preferred embodiments, an example where a preferred embodiment of the present invention is applied to the vehicle 1 has been illustrated. However, besides a vehicle, the preferred embodiment of the present invention may be applied to machinery having a clutch and performing control of suppressing an engine rotational speed.

The present application corresponds to Japanese Patent Application No. 2014-254388 filed in the Japan Patent Office on Dec. 16, 2014, and the entire disclosure of the application is incorporated herein by reference.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A clutch control system arranged to control a clutch interposed in a power transmission path from an engine to an actuated portion, the clutch control system comprising:
    a rotational speed control unit programmed to execute a rotational speed suppression control of suppressing an engine rotational speed of the engine when a predetermined engine rotational speed suppression condition is met; and
    a clutch position control unit programmed to execute
        if the rotational speed control unit is not executing the rotational speed suppression control, a first clutch position control, which is in accordance with engine rotation information, on the clutch, and if the rotational speed control unit is executing the rotational speed suppression control, a second clutch position control, which is lower in response to the engine rotation information as compared to a response of the first clutch position control to the engine rotation information, on the clutch.

2. The clutch control system according to claim 1, wherein the rotational speed suppression control includes a fuel supply cutting control of cutting a supply of fuel to the engine.

3. The clutch control system according to claim 2, wherein the engine includes a fuel injector, and the fuel supply cutting control includes an injection cutting control of cutting fuel injection by the fuel injector.

4. The clutch control system according to claim 1, wherein after the clutch position control unit executes the second clutch position control, the clutch position control unit is programmed to end the second clutch position control and transition to the first clutch position control a predetermined time after the rotational speed control unit ends the rotational speed suppression control.

5. The clutch control system according to claim 1, wherein the rotational speed control unit is programmed to set a determination flag to ON when the engine rotational speed suppression condition is met, and
    the clutch position control unit is programmed to judge that the rotational speed suppression control is being executed when the determination flag is set to ON.

6. The clutch control system according to claim 1, wherein the second clutch position control includes position control of the clutch in accordance with filtered engine rotation information which is the engine rotation information being filtered in a filtering process.

7. The clutch control system according to claim 6, wherein the filtering process includes a process of determining calculated values using values for the engine rotation information at different time points within a predetermined time period.

8. The clutch control system according to claim 6, wherein the second clutch position control includes an ending process to end the second clutch position control by gradually weakening the filtering during the filtering process.

9. The clutch control system according to claim 1, wherein the second clutch position control includes a clutch disengage control of controlling the clutch to a disengagement position, without dependence on the engine rotation information, when a clutch engagement prohibition condition is met.

10. The clutch control system according to claim 6, wherein the second clutch position control includes
    a clutch disengage control of controlling the clutch to a disengagement position if a clutch engagement prohibition condition is met, and
    a clutch engage control of controlling the clutch position in accordance with the filtered engine rotation information if the clutch engagement prohibition condition is not met.

11. The clutch control system according to claim 9, wherein the clutch engagement prohibition condition includes that the engine rotational speed is less than a predetermined rotational speed.

12. The clutch control system according to claim 9, wherein the first clutch position control ends another clutch disengage control if, during execution of the clutch disengage control, the engine rotational speed becomes less than a predetermined value with a throttle opening being fully closed,
    the another clutch disengage control includes controlling the clutch to a disengagement position, without dependence on the engine rotation information.

13. The clutch control system according to claim 1, wherein the clutch control system is arranged to be included in a vehicle capable of switching between actuation and non-actuation of a differential lock, and
    the engine rotational speed suppression condition includes that switching between the actuation and the non-actuation of the differential lock is in progress.

14. The clutch control system according to claim 1, wherein the engine rotational speed suppression condition includes that the engine rotational speed has reached a limit rotational speed associated with an oil pressure of the engine.

15. The clutch control system according to claim 1, wherein the engine rotational speed suppression condition includes that the engine rotational speed has reached a limit rotational speed associated with a temperature of cooling water for cooling the engine.

16. A clutch control system arranged to control a clutch interposed in a power transmission path from an engine to an actuated portion, the clutch control system comprising:
    a hunting determining unit that determines whether or not a hunting condition, under which hunting of an engine rotational speed of the engine occurs, is met; and
    a clutch position control unit programmed to execute
        if the hunting determining unit determines that the hunting condition is not met, a first clutch position control, which is in accordance with engine rotation information, on the clutch, and if the hunting determining unit determines that the hunting condition is met, a second clutch position control, which is lower in response to the engine rotation information as compared to a response of the first clutch position control to the engine rotation information, on the clutch.

17. The clutch control system according to claim 16, further comprising a rotational speed control unit programmed to execute a rotational speed suppression control of suppressing the engine rotational speed of the engine when a predetermined engine rotational speed suppression condition is met;

wherein the hunting determining unit determines that the hunting condition is met when the rotational speed control unit is executing the rotational speed suppression control, and that the hunting condition is not met when the rotational speed control unit is not executing the rotational speed suppression control.

18. The clutch control system according to claim 16, wherein the hunting determining unit is arranged to determine whether or not hunting of the engine rotational speed is actually occurring, and to determine that the hunting condition is met when hunting of the engine rotational speed is actually occurring.

19. The clutch control system according to claim 18, further comprising a rotational speed control unit programmed to execute a rotational speed suppression control of suppressing the engine rotational speed of the engine when a predetermined engine rotational speed suppression condition is met;

wherein the hunting determining unit determines that the hunting condition is met when both the rotational speed control unit is executing the rotational speed suppression control, and the hunting determining unit determines that hunting is actually occurring in the engine rotational speed.

20. The clutch control system according to claim 18, wherein the hunting determining unit determines that hunting is actually occurring in the engine rotational speed if the engine rotational speed increases and decreases within a predetermined time period.

21. The clutch control system according to claim 18, wherein the hunting determining unit determines that hunting is actually occurring in the engine rotational speed if the engine rotational speed increases and decreases for not less than a predetermined number of times within a predetermined time.

22. The clutch control system according to claim 1, wherein in the second clutch position control, a displacement speed of the clutch with respect to the engine rotation information is a lower as compared to a displacement speed of the clutch with respect to the engine rotation information in the first clutch position control.

* * * * *